(12) United States Patent
Shiraiwa

(10) Patent No.: US 6,611,621 B2
(45) Date of Patent: *Aug. 26, 2003

(54) IMAGE PROCESSING METHOD AND APPARATUS, AND RECORDING MEDIUM

(75) Inventor: Yoshinobu Shiraiwa, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,421

(22) Filed: Oct. 26, 1998

(65) Prior Publication Data

US 2002/0168103 A1 Nov. 14, 2002

(30) Foreign Application Priority Data

Oct. 31, 1997 (JP) .............................. 9-300332

(51) Int. Cl.[7] ................................ G06K 9/00
(52) U.S. Cl. ...................... 382/167; 358/523
(58) Field of Search ................ 382/162, 167, 382/166; 358/518, 520, 521, 522, 523; 345/431, 150, 151, 154

(56) References Cited

U.S. PATENT DOCUMENTS

| | | | | |
|---|---|---|---|---|
| 5,646,752 A | * | 7/1997 | Kohler et al. | 358/520 |
| 5,739,928 A | * | 4/1998 | Scott | 358/520 |
| 5,754,184 A | * | 5/1998 | Ring et al. | 345/431 |
| 5,754,682 A | * | 5/1998 | Katoh | 382/162 |
| 5,786,832 A | * | 7/1998 | Madden et al. | 345/431 |
| 5,828,781 A | * | 10/1998 | Nakano | 382/167 |
| 6,307,961 B1 | * | 10/2001 | Balonon-Rosen et al. | 382/167 |

* cited by examiner

*Primary Examiner*—Jingge Wu
(74) *Attorney, Agent, or Firm*—Fitzpatrick, Cella, Harper & Scinto

(57) ABSTRACT

A satisfactory simulation image is provided regardless of an output object observation environment and a display object observation environment. The image processing method for simulating an image output from an image output device in advance includes the steps of: performing a color correction process in accordance with an output object observation environment when an image output from the image output device is observed; and performing a color correction process on image data on which the color correction has been performed in accordance with an output object observation environment and a display object environment when a simulation image is observed.

10 Claims, 43 Drawing Sheets

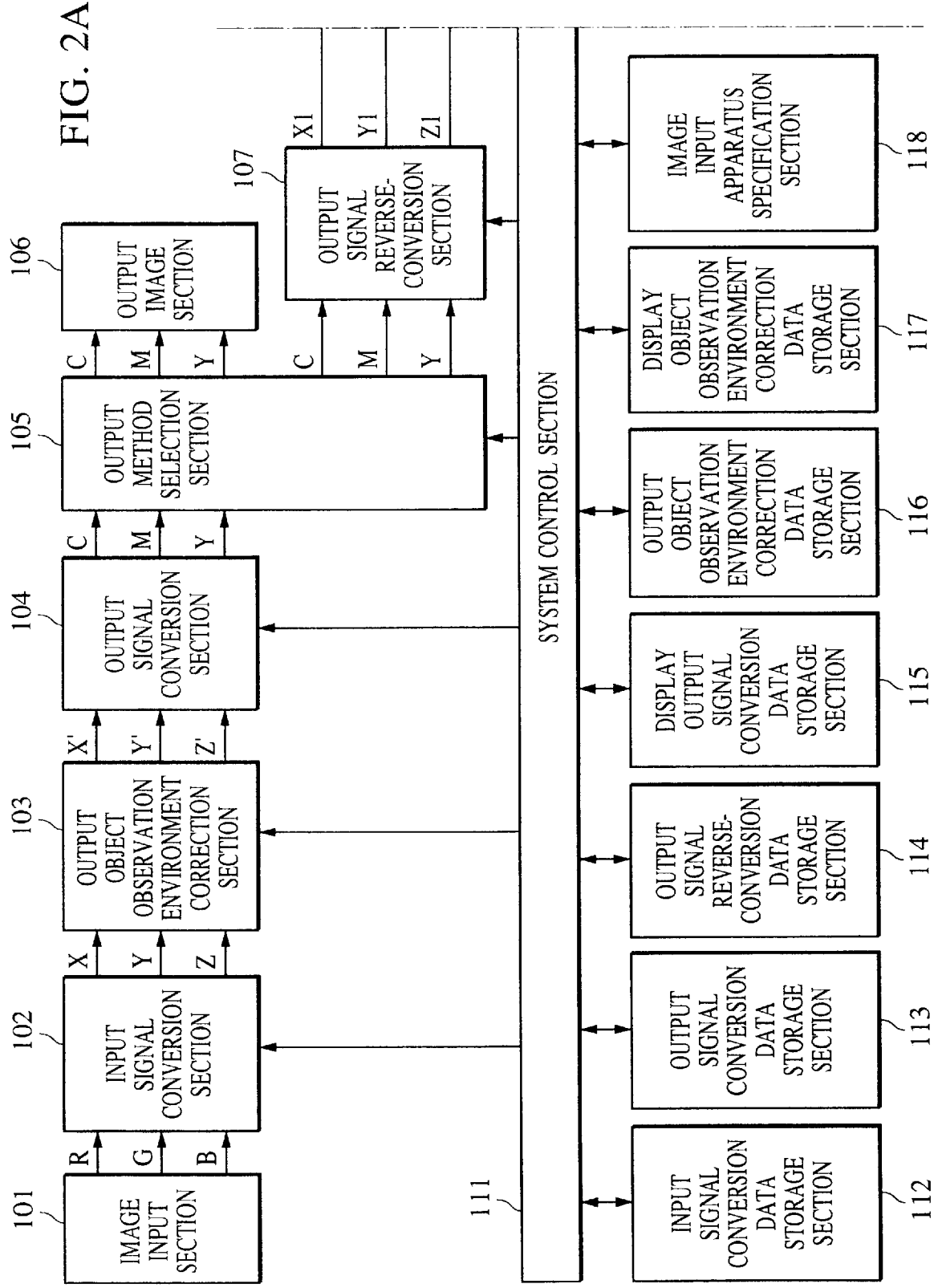

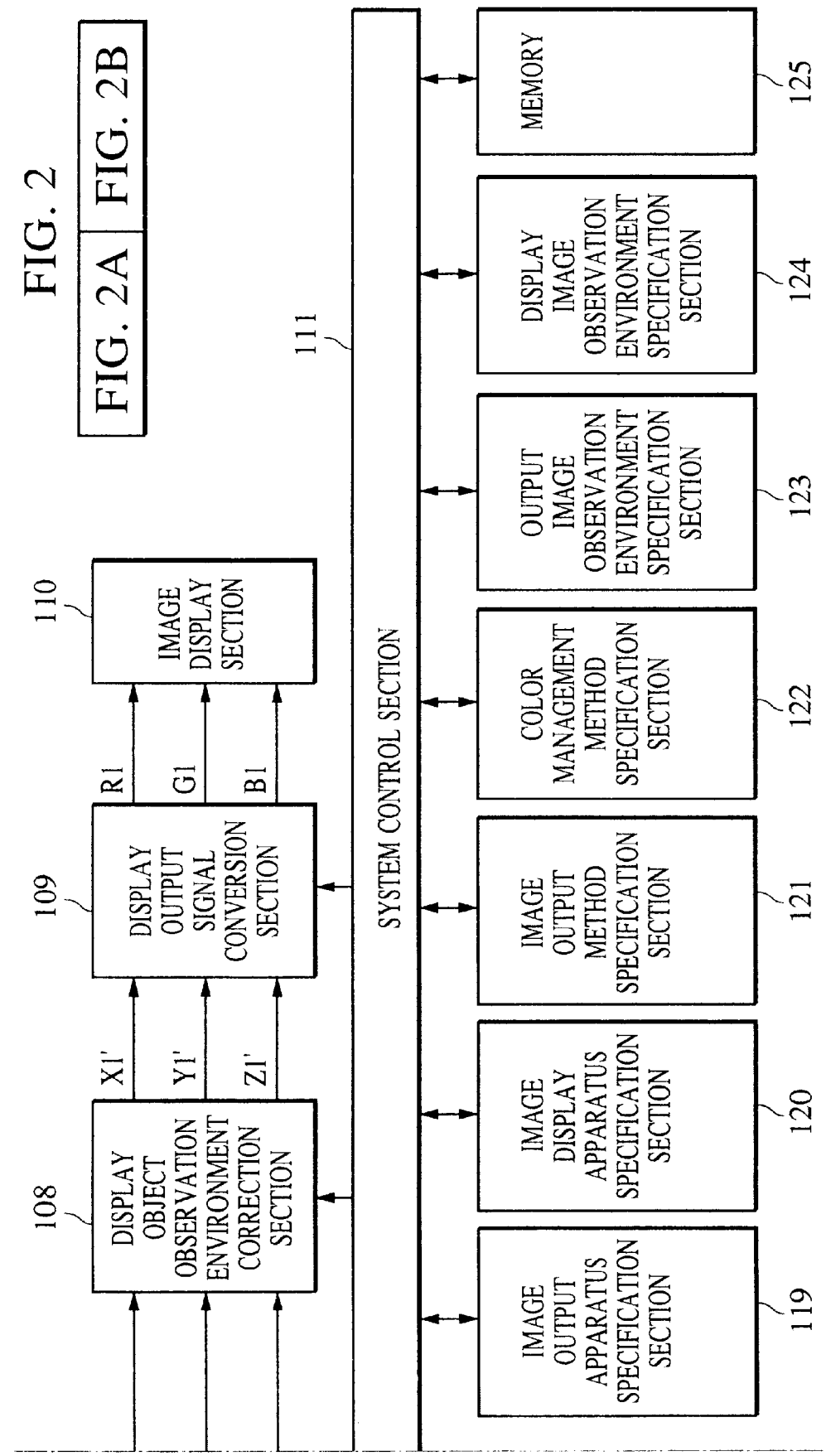

FIG. 5A

MAIN

INPUT APPARATUS :

OUTPUT APPARATUS :

DISPLAY APPARATUS :

IMAGE OUTPUT METHOD :   OUTPUT    DISPLAY

COLOR MANAGEMENT METHOD    Perceptual

OUTPUT IMAGE OBSERVATION ENVIRONMENT :  SELECT    DEFAULT

DISPLAY IMAGE OBSERVATION ENVIRONMENT :  SELECT    DEFAULT

EXECUTE    CANCEL

FIG. 5B

OUTPUT IMAGE OBSERVATION ENVIRONMENT

TYPE OF LIGHT SOURCE :

FIG. 5C

DISPLAY IMAGE OBSERVATION ENVIRONMENT

TYPE OF LIGHT SOURCE :

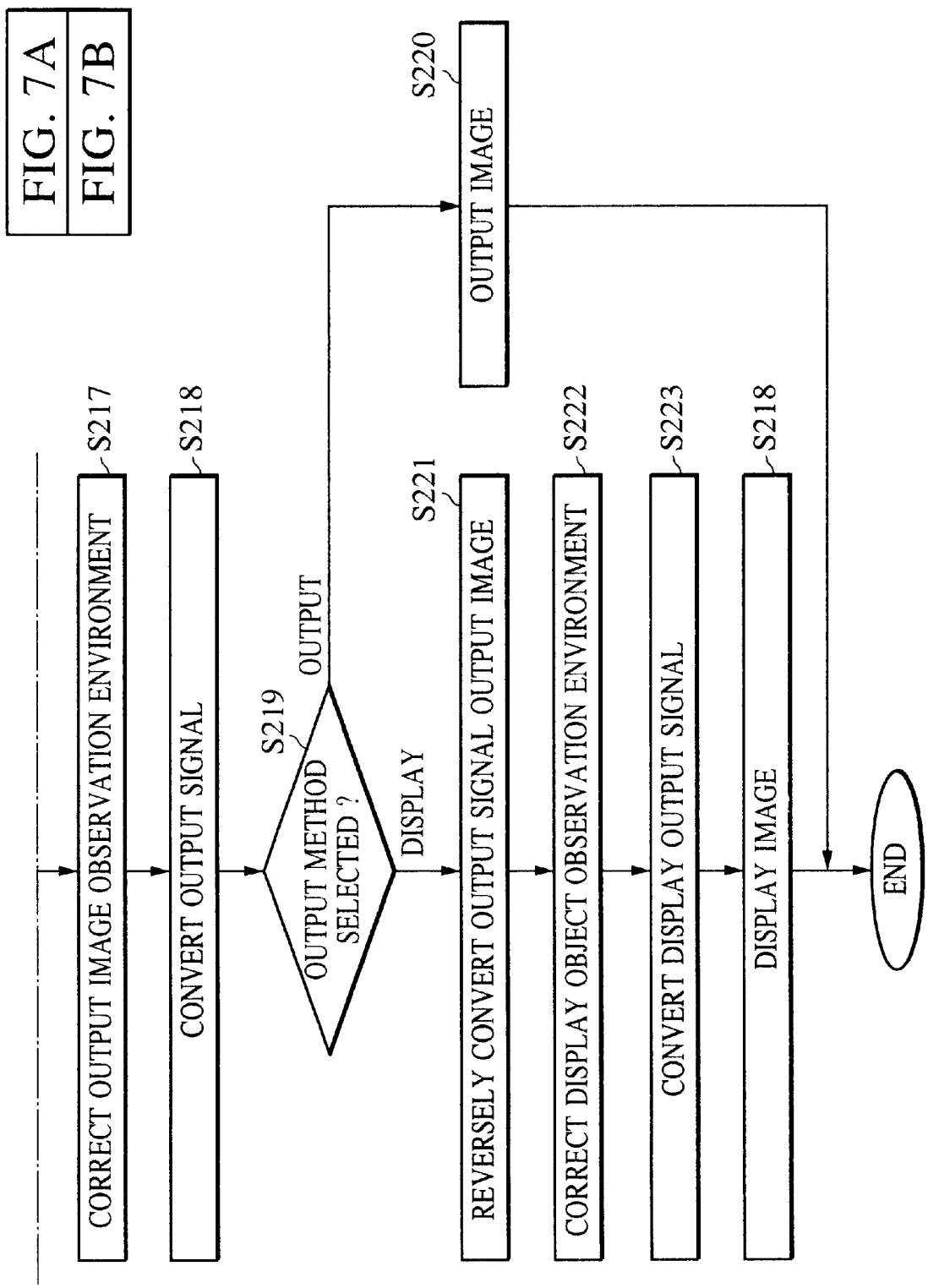

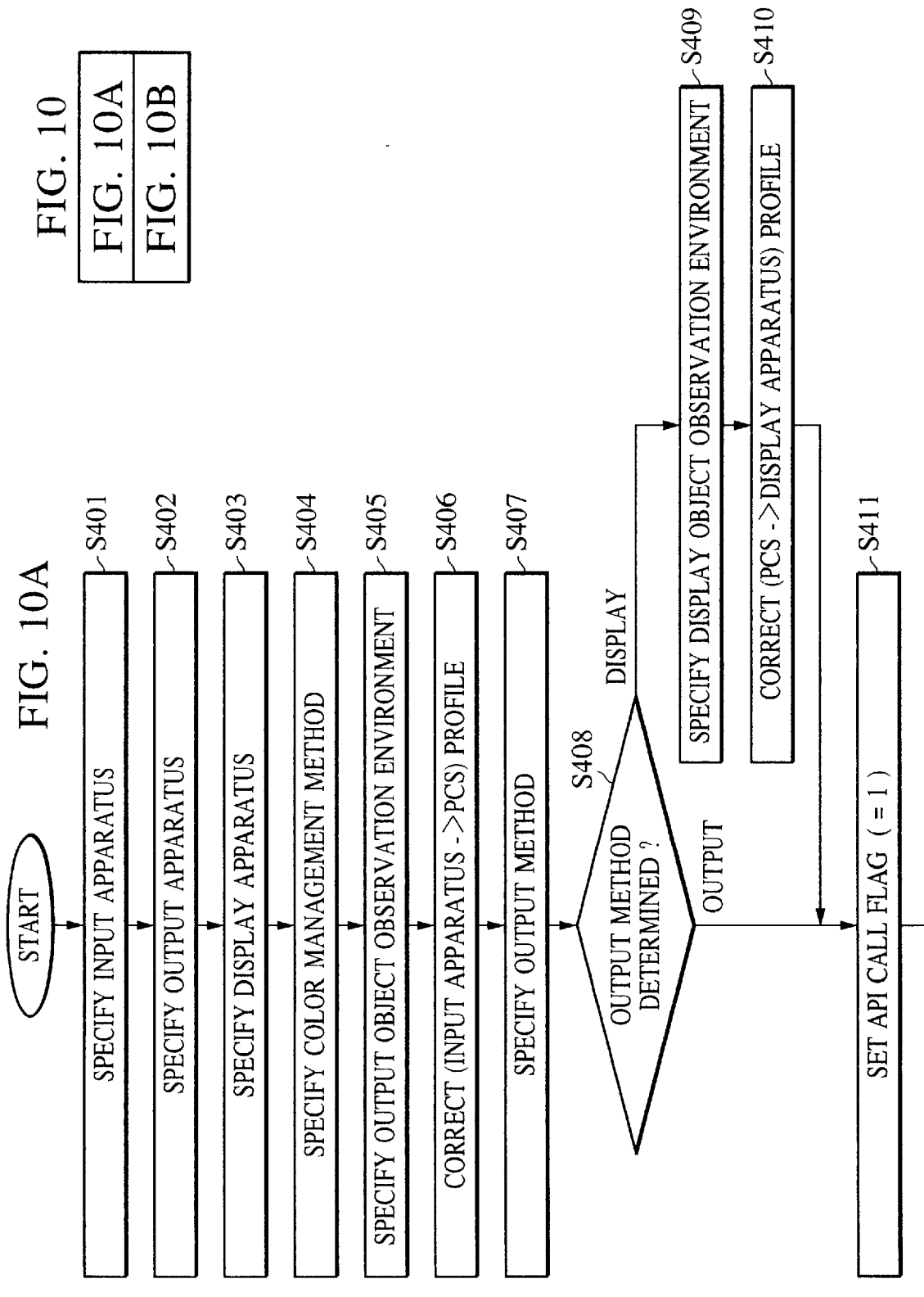

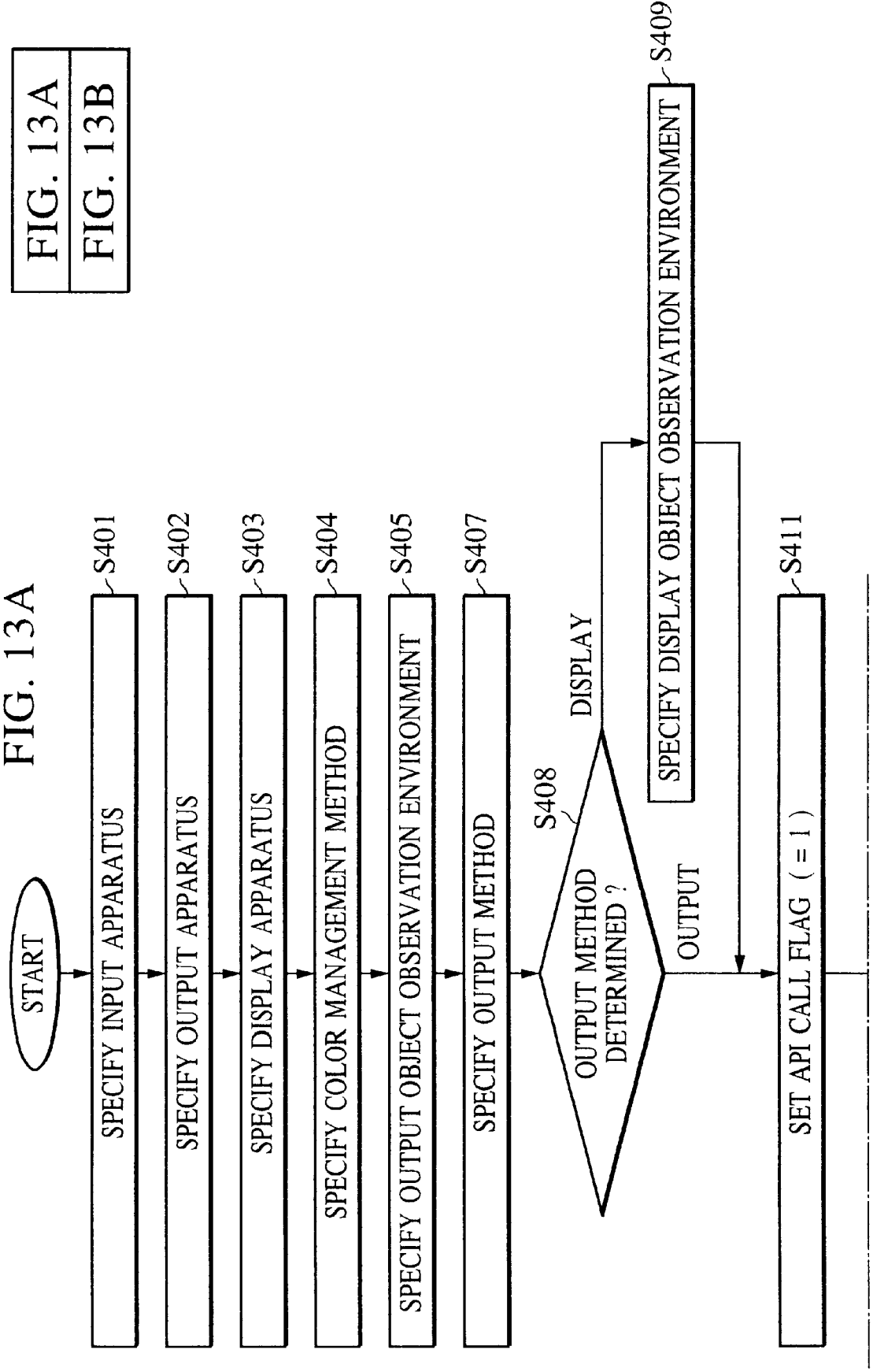

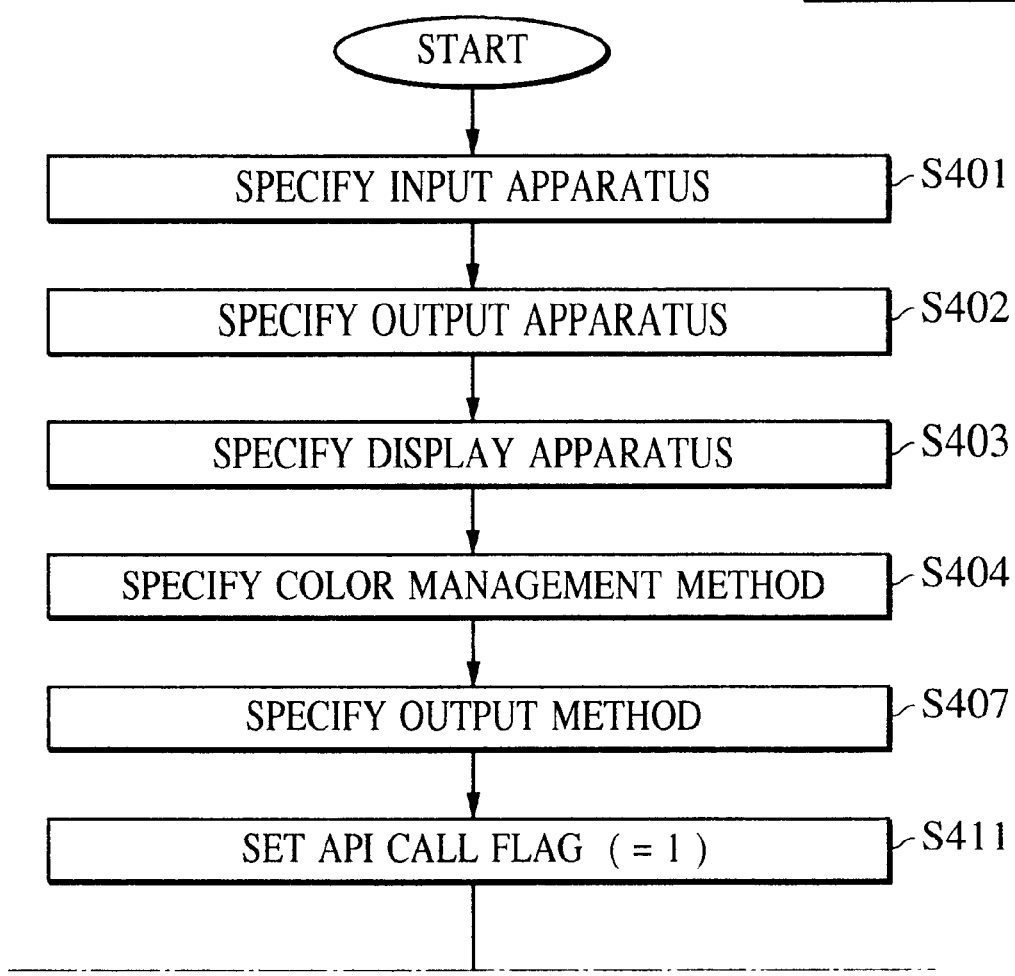

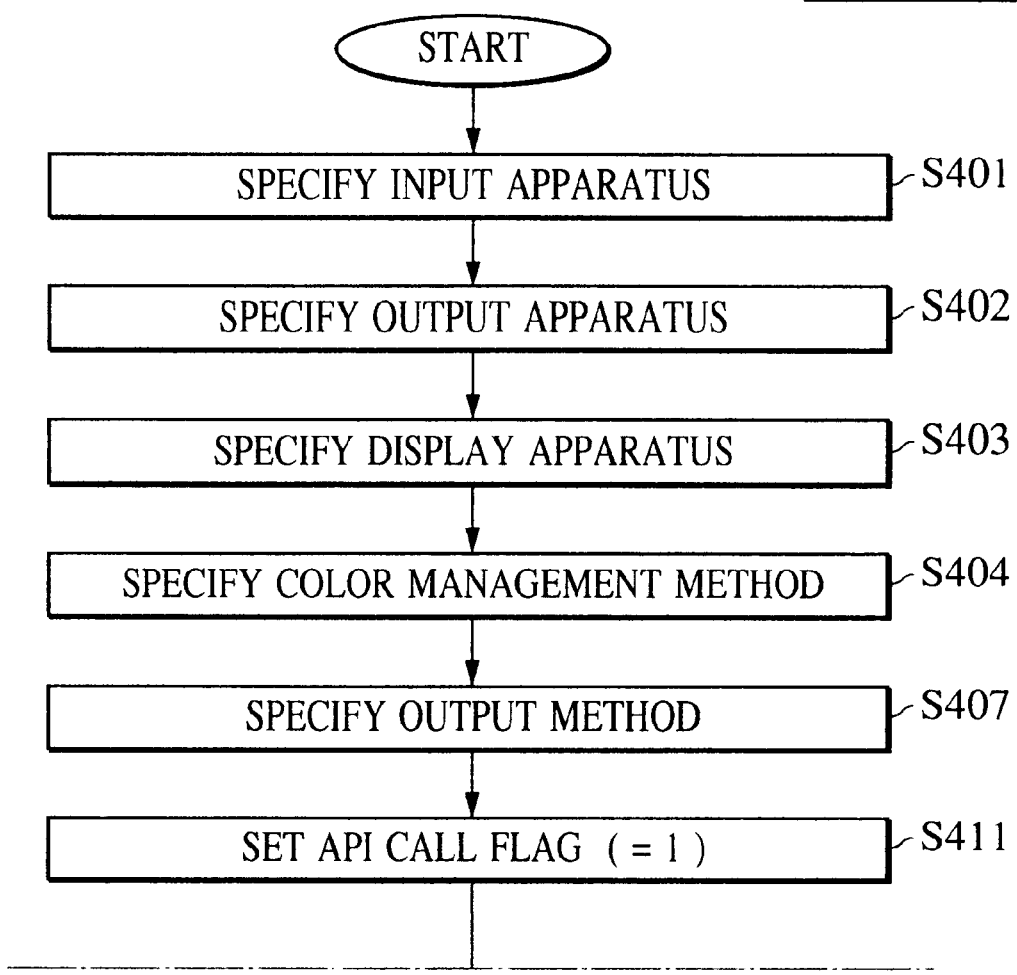

IMAGE PROCESSING METHOD AND APPARATUS, AND RECORDING MEDIUM

BACKGROUND OF THE INVENTION

1. Field of the Invention

The present invention relates to an image processing method and apparatus for performing color correction on the basis of an image observation environment, and a recording medium.

2. Description of the Related Art

In recent years, color image products have become ubiquitous, and color images have come to be handled with ease not only in special fields, such as design production using CG, but also in ordinary offices.

In general, when an image produced on a monitor is output by a printer, the colors of the image on the monitor and the printed image do not match each other, and it is difficult to carry out color studies of printed matter on a monitor. As a method for solving this mismatch, a color management system (CMS) has been devised and has attracted attention.

The color management system eliminates differences in colors for each device by using a common color space. In this color management system, under the precept that colors described at the same coordinates in the same color space can be seen the same, all the colors are represented in the same color space, and their corresponding coordinates are made to coincide with each other, thereby obtaining a coinciding appearance of colors. At present, as one of the more commonly used methods, there is a method in which a CIE-XYZ color space is used as the color space, and differences in each device are corrected by using XYZ tristimulus values, which are its internal description coordinate values.

Referring to FIG. 1, a description will be given of an environment for observing an image. In FIG. 1, a case is shown in which an image 202, which is the same as the object for printing 201, is displayed on a monitor 203.

A printed image and an image displayed on a CRT are not always observed under invariable ambient light, but ambient light 204 of FIG. 1 varies. In such a case, even if color matching can be obtained under a type of ambient light, the appearance of the image varies due to variation of the ambient light.

SUMMARY OF THE INVENTION

A first object of the present invention is to realize satisfactory color appearance regardless of an observation environment.

A second object of the present invention is to provide a satisfactory simulation image regardless of the observation environment of an output object and that of an object of display.

A third object of the present invention is to enable profile data which is used for an observation environment correction process to be managed efficiently in a systematic manner.

A fourth object of the present invention is to enable a color matching process based on information specified by a user to be performed efficiently in a systematic manner.

To achieve the above-mentioned objects, according to a first aspect of the present invention, there is provided an image processing method for simulating an image output from an image output device in advance, the method comprising the steps of: performing a color correction process in accordance with an output object observation environment when an image output from the image output device is observed; and performing a color correction process on image data on which the color correction has been performed in accordance with an output object observation environment and a display object environment when a simulation image is observed.

According to a second aspect of the present invention, there is provided an image processing method, comprising the steps of: inputting image data; performing a color correction process on the image data by using profile data; and performing an observation environment correction process on image data on which the color correction process has been performed, wherein color correction data, used for the color correction process, stored in the profile data, is corrected by observation environment correction data used for the observation environment correction process, and the color correction process and the observation environment correction process are realized by using the corrected data.

According to a third aspect of the present invention, there is provided an image processing method, comprising the steps of: inputting image data; performing a color correction process on the image data by using profile data; and performing an observation environment correction process on image data on which the color correction process has been performed in accordance with an output image observation environment, wherein observation environment correction process data used for the observation environment correction process is added to the profile data independently of color correction data used for the color correction process.

According to a fourth aspect of the present invention, there is provided an image processing apparatus, comprising: an application section capable of communicating with a CMS framework API which performs control with a color management system as an operating system; and a color management module section for performing a color matching process by using a device profile in accordance with a command from the CMS framework API, wherein the application section corrects the device profile on the basis of information specified through a user interface section.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows the construction of an image processing apparatus according to a first embodiment of the present invention.

FIGS. 5A, 5B, and 5C show a user interface screen.

DETAILED DESCRIPTION OF THE PREFERRED EMBODIMENTS

First Embodiment

Figure 1:
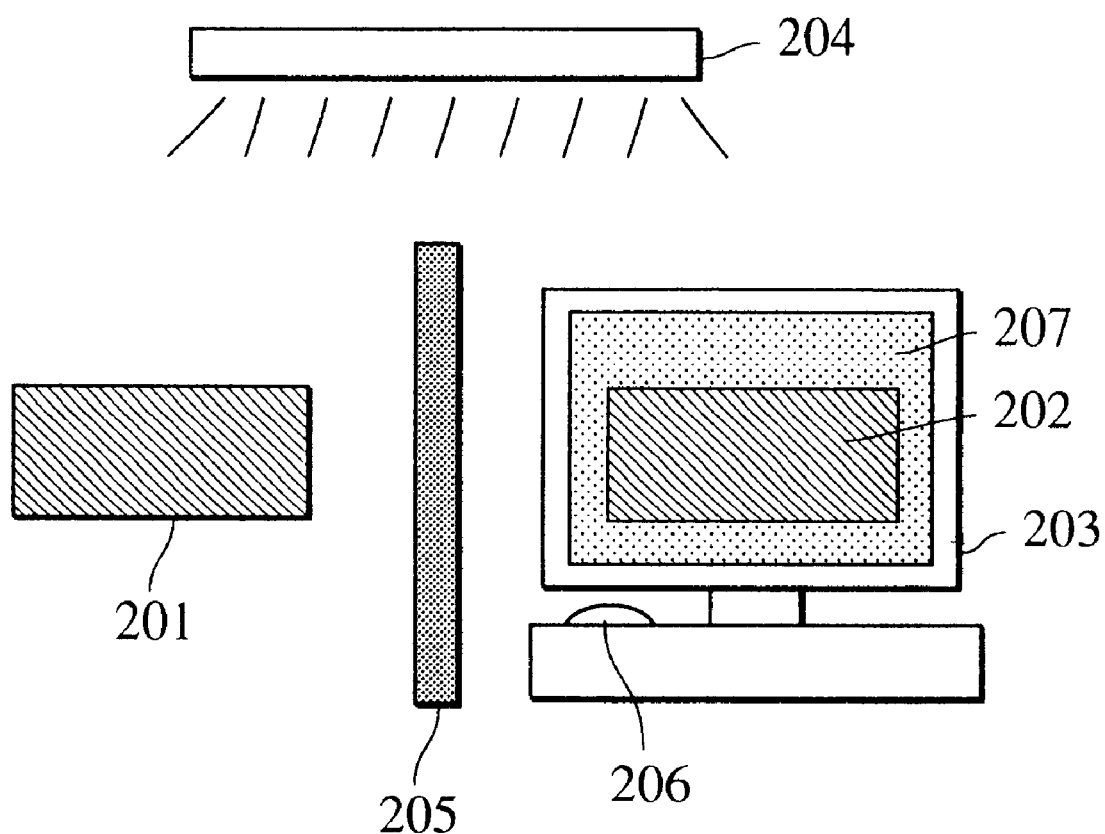
FIG. 1 shows an example of an image observation environment.

FIG. 2 shows a color image output apparatus of the present invention. An image input section 101 is formed of a scanner and a digital camera and inputs a photographic subject, prints, printed matter, etc. as color image signals of RGB.

The color image signals RGB obtained by the image input section 101 are converted into XYZ signals which are not dependent upon an input apparatus by an input signal conversion section 102 by using input signal conversion data appropriate to the type of image input apparatus which constitutes the image input section 101.

For the conversion in the input signal conversion section 102, at first, by considering input gamma characteristics, a look-up table conversion is performed for each signal of RGB.

$R' = LUT_R (R)$ $G' = LUT_G (G)$ $B' = LUT_B (B)$

Next, conversion from the RGB signals into XYZ signals is performed by using a 3×3 matrix $MTX_{RGB2XYZ}$.

$$\begin{bmatrix} X \\ Y \\ Z \end{bmatrix} = MTX_{RGB2XYZ} \begin{bmatrix} R' \\ G' \\ B' \end{bmatrix} \quad (1)$$

The color space used herein is not limited to the XYZ color space, and as long as a color space in which differences in devices can be absorbed, any color space may be used (for example, CIELUV, CIELAB, etc.).

The input signal conversion data includes the above-described color conversion matrix $MTX_{RGB2XYZ}$, and $LUT_R$, $LUT_G$, and $LUT_B$. Input signal conversion data regarding a plurality of image input apparatuses is stored in an input signal conversion data storage section 112.

The XYZ signals obtained in the input signal conversion section 102 are converted by an output object observation environment correction section 103 into image signals X'Y'Z' under the output object observation environment by an observation environment correction matrix XYZ2X'Y'Z' described below.

$$\begin{bmatrix} X' \\ Y' \\ Z' \end{bmatrix} = XYZ2X'Y'Z' \begin{bmatrix} X \\ Y \\ Z \end{bmatrix} \quad (2)$$

The matrix XYZ2X'Y'Z' is output object observation environment correction data.

Here, by using a case in which an image is observed under a type of illumination light (environment light) as an example, a description will be given of a method of producing a color signal conversion matrix XYZ2X'Y'Z' as observation environment correction data corresponding to the illumination light. XYZ2X'Y'Z' can be obtained by the following matrix computation:

$XYZ2X'Y'Z' = CR^{-1} M^{-1} \cdot D \cdot M$ $$D = \begin{bmatrix} \frac{R'_w}{R_w} & 0 & 0 \\ 0 & \frac{G'_w}{G_w} & 0 \\ 0 & 0 & \frac{B'_w}{B_w} \end{bmatrix} \quad (3)$$

$$\begin{bmatrix} R'_w \\ G'_w \\ B'_w \end{bmatrix} = M \begin{bmatrix} X'_w \\ Y'_w \\ Z'_w \end{bmatrix}$$

-continued $$\begin{bmatrix} R_w \\ G_w \\ B_w \end{bmatrix} = M \begin{bmatrix} X_w \\ Y_w \\ Z_w \end{bmatrix}$$

The above matrix is a matrix which converts the tristimulus values XYZ represented by the CIEXYZ representation system into a response amount RGB at the photoreceptor (cone) level of the human eye. $X'_w Y'_w Z'_w$' are tristimulus values of the illumination light of the environment. Also, $X_w Y_w Z_w$ are tristimulus values of a standard light source (D65). The reason why the tristimulus values of D65 are used herein as $X_w Y_w Z_w$ is that D65-dependent XYZ data is output from input signal conversion. When XYZ data which depends upon another light source is output from input signal conversion, the tristimulus values of the light source are set as $X_w Y_w Z_w$.

A matrix CR is a matrix which converts chromatic signals ($X_{D65} Y_{D65} Z_{D65}$) in the standard light source (D65) into chromatic signals ($X_s Y_s Z_s$) in the light source during observation (illumination light of the environment). Here, a 3×3 matrix is used as a matrix CR. Based on the following equation using the matrix CR, the chromatic signals ($X_{D65} Y_{D65} Z_{D65}$) in the standard light source are converted into chromatic signals ($X_s Y_s Z_s$) in the light source during observation.

$$\begin{bmatrix} X_s \\ Y_s \\ Z_s \end{bmatrix} = CR \begin{bmatrix} X_{D65} \\ Y_{D65} \\ Z_{D65} \end{bmatrix} \quad (4)$$

Figure 3:
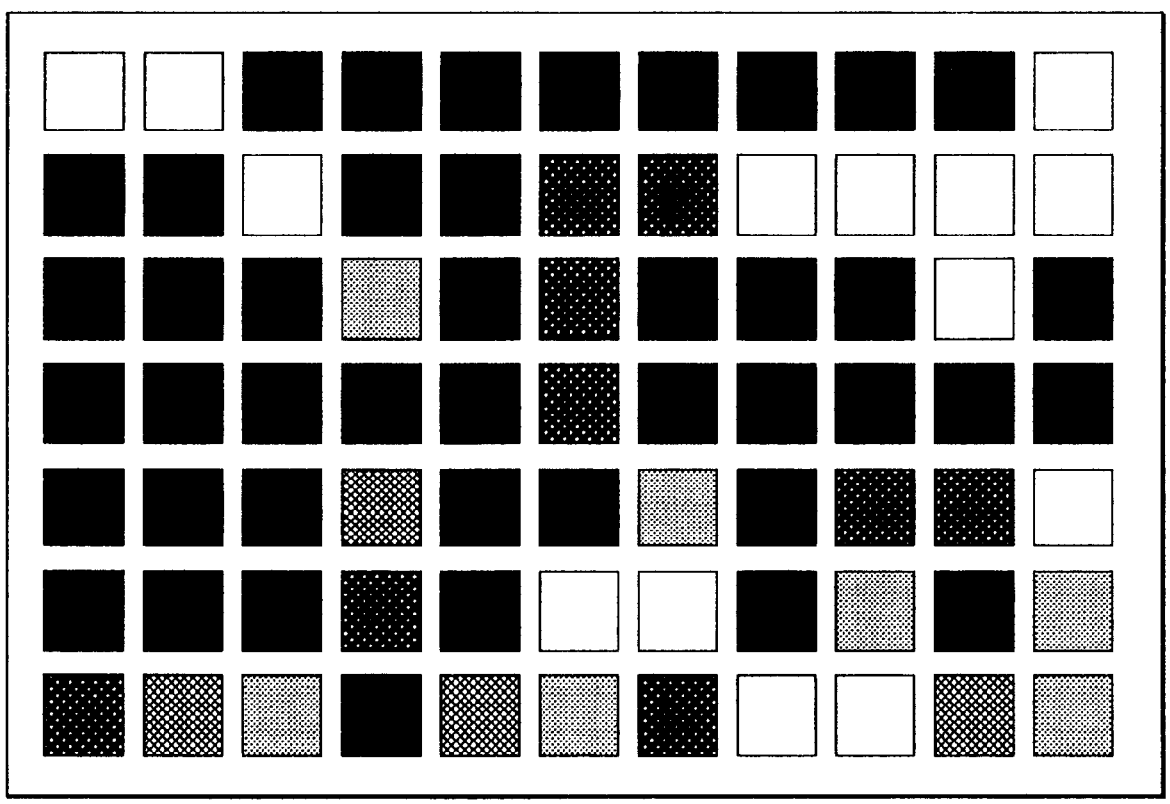
FIG. 3 shows a test chart used for obtaining coefficients of a matrix CR.

The coefficients of the matrix CR can be determined in such a way that the tristimulus values under the light source during observation and the tristimulus values under the standard light source are determined and the values are optimized by, for example, an attenuation least-squares method by using the test chart of the color patch of 77 colors shown in FIG. 3.

The output observation environment correction data regarding a plurality of output object observation environments is stored in an output object observation environment correction data storage section 116.

By performing the above output object observation environment correction, it is possible to obtain printed matter having the same appearance as that observed under the standard light source regardless of the observation environment of the printed matter. Also, if the standard light source used in the above description is assumed to be a light source in an environment in which printed matter is expected to be observed, it is possible to obtain printed matter which provides the same appearance as that observed in that environment.

The X'Y'Z' signals obtained by the output object observation environment correction section 103 are converted into output-apparatus-dependent CMY signals on the basis of the characteristics of the image output section 106 by the output signal conversion section 104. The conversion in the output signal conversion section 104 is performed by a three-dimensional LUT.

(C, M, Y)=$LUT_{XYZ2CMY}$ (X', Y', Z')

This three-dimensional LUT is stored as output signal conversion data in the output signal conversion data storage section 113.

The output image signals CMY obtained in the output signal conversion section 104 are sent by an output method selection section 105 to the image output section 106 or the output signal reverse-conversion section 107 in accordance with the instruction contents of an image output method specification section 121 through a system control section 111.

The image output section 106 is formed of a printer such as an electrophotographic printer or an ink jet printer, and receives the output image signals CMY sent from the output method selection section 105 and prints out the image.

Upon receiving the output image signals CMY sent from the output method selection section 105, the output signal reverse-conversion section 107 converts the output-apparatus-dependent signals CMY into output-apparatus-independent X1Y1Z1 signals by using output signal reverse-conversion data (three-dimensional LUT) based on the characteristics of the image output section 106.

(X1, Y1, Z1)=$LUT_{CMY2XYZ}$ (C, M, Y)

This three-dimensional LUT is stored as output signal reverse-conversion data in an output signal reverse-conversion data storage section 114.

The X1Y1Z1 signals obtained in the output signal reverse-conversion section 107 are converted by a display object observation environment correction section 108 into image signals X1'Y1'Z1' in the display object observation environment in accordance with a matrix X1Y1Z12X1'Y1'Z1' which is correction data in the display object observation environment.

$$\begin{bmatrix} X1' \\ Y1' \\ Z1' \end{bmatrix} = X1Y1Z12X1'Y1'Z1' \begin{bmatrix} X1 \\ Y1 \\ Z1 \end{bmatrix} \quad (5)$$

Here, by using a case in which an output image is observed under a type of illumination light (output object observation environment light) and a display object is observed under another illumination light (display object observation environment light) as an example, a description will be given of a method of producing a color signal conversion matrix X1Y1Z12X1'Y1'Z1' as display object observation environment correction data corresponding to such observation conditions.

The case in which the output object and the display object are observed under the same environment light is equivalent to the case in which the output object observation environment light and the display object observation environment light are the same.

X1Y1Z12X1'Y1'Z1' can be obtained by the following matrix computation.

$$X1Y1Z12X1'Y1'Z1' = M^{-1} \cdot D \cdot M \cdot CR$$

$$D = \begin{bmatrix} \frac{R'_w}{R_{wl}} & 0 & 0 \\ 0 & \frac{G'_w}{G_{wl}} & 0 \\ 0 & 0 & \frac{B'_w}{B_{wl}} \end{bmatrix} \quad (6)$$

$$\begin{bmatrix} R_{wl} \\ G_{wl} \\ B_{wl} \end{bmatrix} = M \begin{bmatrix} X_{wl} \\ Y_{wl} \\ Z_{wl} \end{bmatrix}$$

$$\begin{bmatrix} R'_w \\ G'_w \\ B'_w \end{bmatrix} = M \begin{bmatrix} X'_w \\ Y'_w \\ Z'_w \end{bmatrix}$$

The above matrix M is a matrix which converts the tristimulus values XYZ in the CIEXYZ representation system into a response amount RGB at the photoreceptor (cone) level of the human eye. $X_{w1} Y_{w1} Z_{w1}$ are tristimulus values of the output object observation environment light. $X_w Y_w Z_w$ are tristimulus values of reference white in the display object observation environment and is determined by the following equations by using tristimulus values $X'_{w1} Y'_{w1} Z'_{w1}$ of the display object observation environment light and the tristimulus values $X_{w2} Y_{w2} Z_{w2}$ of the display white of the display apparatus.

$X_w = (1-s) \cdot X'_{w1} + s \cdot X_{w2}$
$Y_w = (1-s) \cdot Y'_{w1} + s \cdot Y_{w2}$
$Z_w = (1-s) \cdot Z'_{w1} + s \cdot Z_{w2}$ where $X_w Y_w Z_w$ are the tristimulus values of white when the image displayed in the image display section 110 is observed. In a case in which an image on the display apparatus screen is observed, the observer does not adapt to the display screen only, but adapts to both the display screen and the observation environment light (ambient light) at a particular proportion. Therefore, if the proportion of the adaptation to the white on the display screen, that is, a parameter (adaptation proportion) indicating the influence that the display white exerts upon the reference white with respect to the observation environment white is denoted as s, the tristimulus values $X_w Y_w Z_w$ of the reference white can be determined by the above-described equations. The adaptation proportion s varies due to color temperature of the observation environment light (ambient light) and the background color (background color of the display screen) of the image. For example, when the background color is varied from black to white at a gray scale level, the more the background color comes close to black, the more the proportion that the observer adapts to the ambient light is increased.

A matrix CR is a matrix which converts chromatic signals (X1Y1Z1) in the standard light source (D65) into chromatic signals (X1"Y1"Z1") in the light source during observation. Here, a 3×3 matrix is used as a matrix CR. Based on the matrix CR, the chromatic signals (X1"Y1"Z1") are obtained from the chromatic signals (X1Y1Z1) based on the following equation.

$$\begin{bmatrix} X1'' \\ Y1'' \\ Z1'' \end{bmatrix} = CR \begin{bmatrix} X1 \\ Y1 \\ Z1 \end{bmatrix} \quad (7)$$

The coefficients of the matrix CR can be determined in such a way that the tristimulus values under this illumination light and the tristimulus values under the standard light source are optimized by, for example, an attenuation least-squares method by using the test chart of the color patch of 77 colors such as that shown in FIG. 3.

Figure 4:
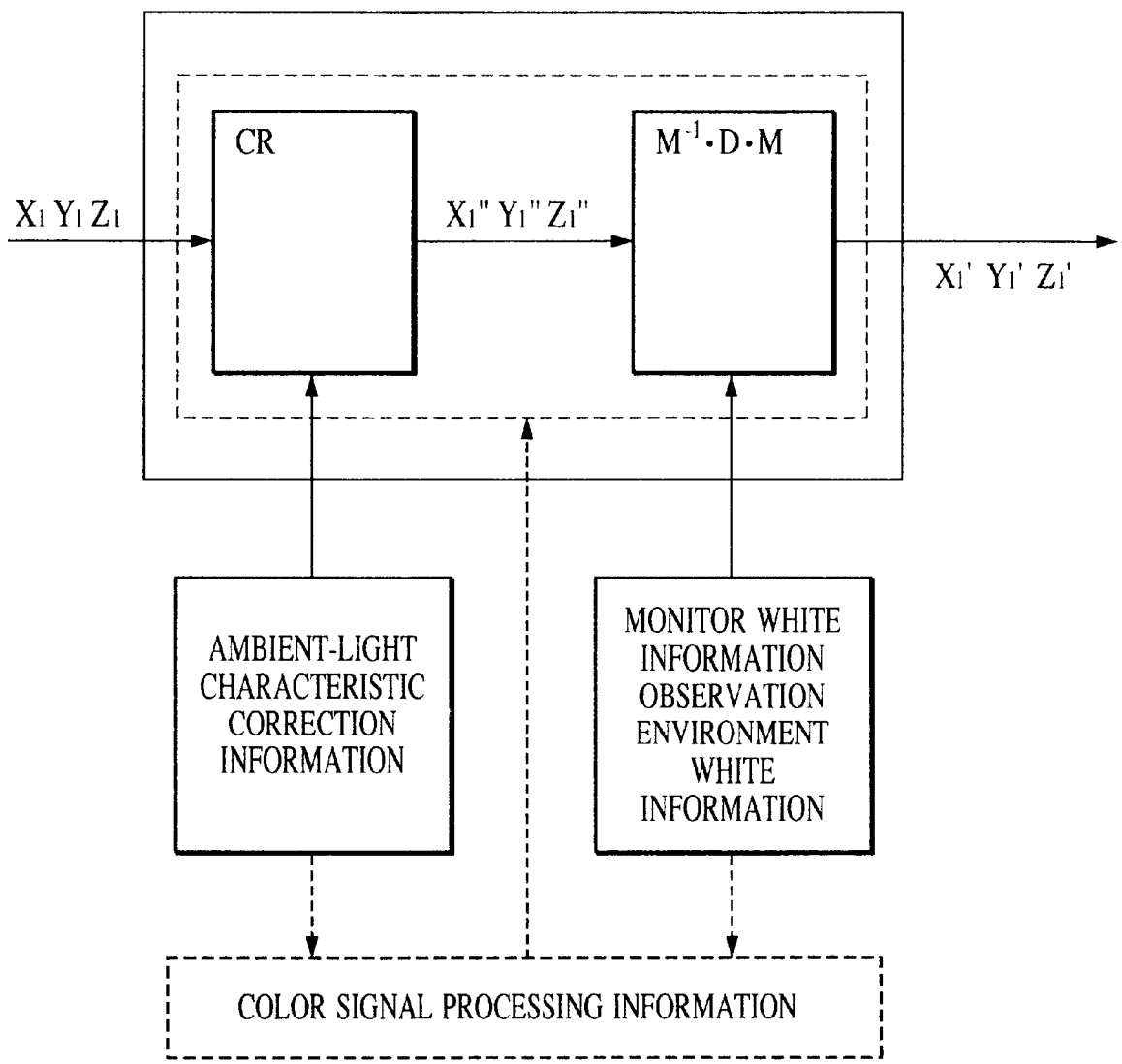
FIG. 4 shows the concept of the structure of a matrix X1Y1Z12X1'X1'Y1'Z1'.

The matrix X1Y1Z12X1'Y1'Z1', as shown in FIG. 4, is formed of two elements of the matrix CR and the matrix $M^{-1} \cdot D \cdot M^{-1}$ from a conceptual point of view. The matrix CR is a matrix that converts the chromatic signals (X1Y1Z1) which are dependent upon the standard light source of the scanner into chromatic signals (X1"Y1"Z1") under the observation environment light. More specifically, the matrix CR converts the X1Y1Z1 signals dependent upon the standard light source into X1"Y1"Z1" signals dependent upon the observation environment light on the basis of the characteristics of the light source, such as color rendering, in the observation environment. Then, the matrix $M^{-1} \cdot D \cdot M^{-1}$, which is another element, converts the X1"Y1"Z1" signals dependent upon the observation environment light into X1'Y1'Z1' signals dependent upon the standard white based on Von. Kries's theorem, which is a chromatic adaptation prediction theorem. In this manner, at first, conversion is performed based on the spectroscopic characteristics of the output object observation environment light, and then chromatic adaptation prediction is performed on the basis of the display object environment light and the reference white during display object observation, determined by white of the display apparatus, making it possible to perform satisfactory signal conversion in which the spectroscopic characteristics of the observation environment and the chromatic adaptation characteristics (the fact that the reference white during display object observation is affected by both of the white of the display screen and the white of the ambient light) of the observer are taken into consideration.

Therefore, it is possible to display a display image that gives the same appearance as an output image obtained by the image output section 106 on the image display section 110.

The X1'Y1'Z1' signals obtained by the display object observation environment correction section 108 are converted by the display output signal conversion section 109 into R1G1B1 signals dependent upon the display apparatus on the basis of the characteristics of the image display section 110.

The conversion in the display output signal conversion section 109 is performed in such a way that, first, conversion of the X1'Y1'Z1' signals into R1'G1'B1' signals dependent upon the image display section 110 is performed by using a 3×3 matrix $MTX_{X1'Y1'Z1'2R1'G1'B1'}$.

$$\begin{bmatrix} R1' \\ G1' \\ B1' \end{bmatrix} = MTX_{X1'Y1'Z1'2R1'G1'B1'} \begin{bmatrix} X1' \\ Y1' \\ Z1' \end{bmatrix} \quad (8)$$

Next, in order that the output gamma characteristics of the image display section are corrected, look-up table conversion is performed for each signal of R1'G1'B1'.

R1 = $LUT_R$ (R1')
G1 = $LUT_G$ (G1')
B1 = $LUT_B$ (B1')

The display output signal conversion data of the image display section contains the above-described color conversion matrix $MTX_{X1'Y1'Z1'2R1'G1'B1'}$ and $LUT_R$, $LUT_G$, and $LUT_B$. The display output signal conversion data regarding a plurality of image display apparatuses is stored in a display output signal conversion data storage section 115.

The output image signal R1G1B1 obtained in the display output signal conversion section 109 is sent to the image display section 110 whereby the image is displayed. The image display section 110 is formed of a CRT or a monitor, such as an LCD, and receives display output image signals R1G1B1 sent from the display output signal conversion section 109 and displays the image.

The system control section 111 controls the operation of this system, causing data to be input, through a user interface shown in FIGS. 5A, 5B, and 5C, into an image input apparatus specification section 118, an image output apparatus specification section 119, an image display apparatus specification section 120, an image output method specification section 121, a color management method specification section 122, an output image observation environment specification section 123, and a display image observation environment specification section 124. In accordance with the specification data, the system control section 111 receives input apparatus conversion data, output signal conversion data, output signal reverse-conversion data, display output signal conversion data, output object observation environment correction data, and display object observation environment correction data from the input signal conversion data storage section 112, the output signal conversion data storage section 113, the output signal reverse-conversion data storage section 114, the display output signal conversion data storage section 115, the output object observation environment correction data storage section 116, and the display object observation environment correction data storage section 117, respectively, and sets the above data in the input signal conversion section 102, the output object observation environment correction section 103, the output signal conversion section 104, the output signal reverse-conversion section 107, the display object observation environment correction section 108, and the display output signal conversion section 109, respectively. Also, the image output method specification data is set in the output method selection section.

A memory 125 has stored therein a flowchart for the operation of the system control section 111 and a user interface screen. In accordance with this, this system operates under the control of the system control section 111.

Figure 6:
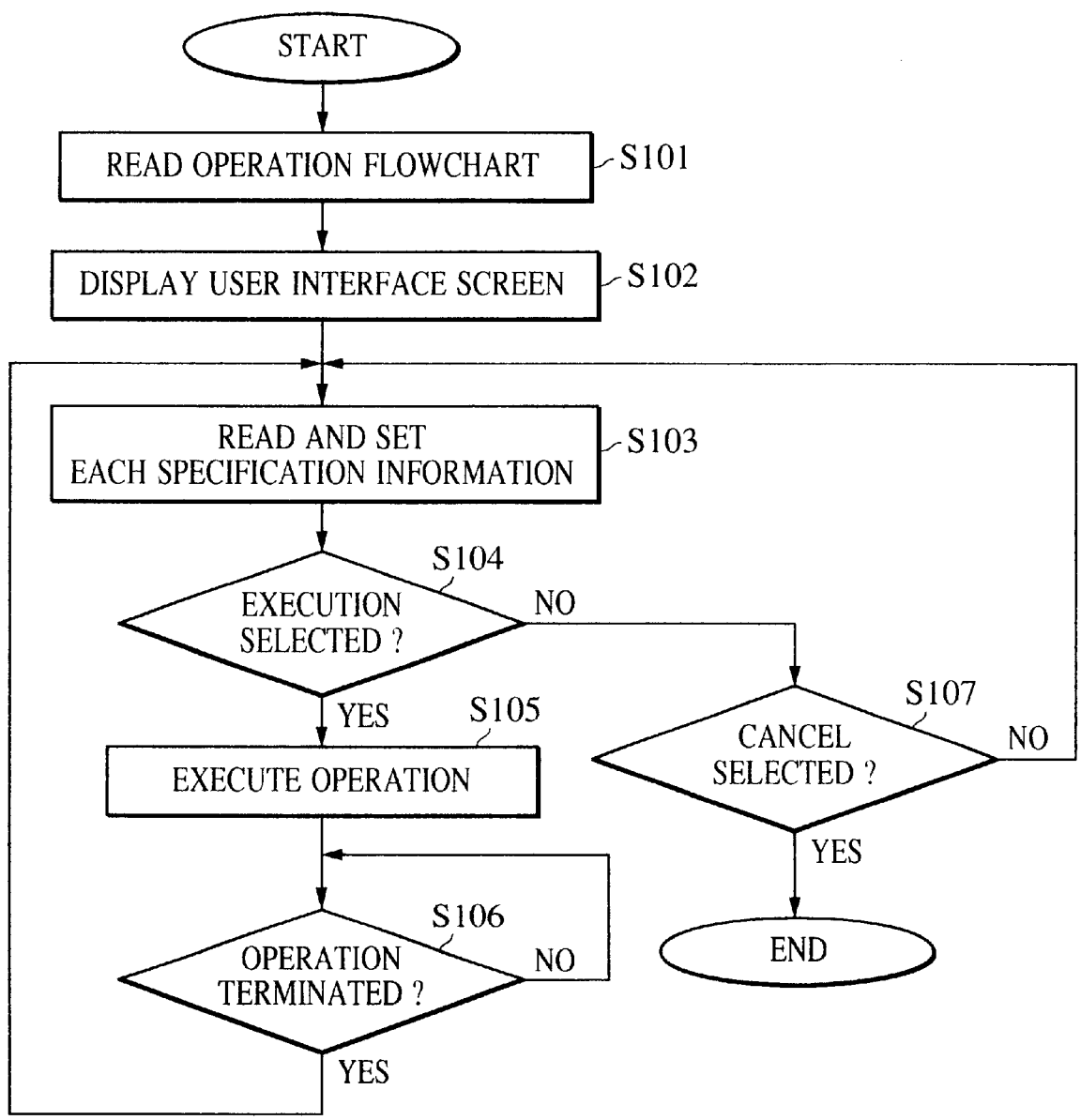
FIG. 6 is a flowchart of a user interface.

Next, the operation of this embodiment is described. FIG. 6 is a flowchart showing the operation of the user interface of this system. When this system is accessed, in step S101, the system control section 111 reads the operation flowchart shown in FIG. 6 from a memory 120. Next, in step S102, user interface screen information shown in FIG. 5A is read and displayed. In the subsequent step S103, user interface information is retrieved through this user screen, and specification information is set in each information specification section. In step S104, a determination is made of the selection of an EXECUTE button. When it is determined that the EXECUTE button has been selected, the process proceeds to step S105 where the process of the operation flowchart is executed. When it is determined that the EXECUTE button has not been selected, the process proceeds to step S107 where a determination is made of the selection of a CANCEL button. When it is determined that the CANCEL button has been selected, this system terminates. When the CANCEL button has not been selected, the process returns to step S103. In step S106, a determination is made of the operation termination. When the operation has been terminated, the process returns to step S103. When the operation has not been terminated, this system waits in a standby state in step S106. The foregoing is the operation of the user interface of this system.

Figure 7A:
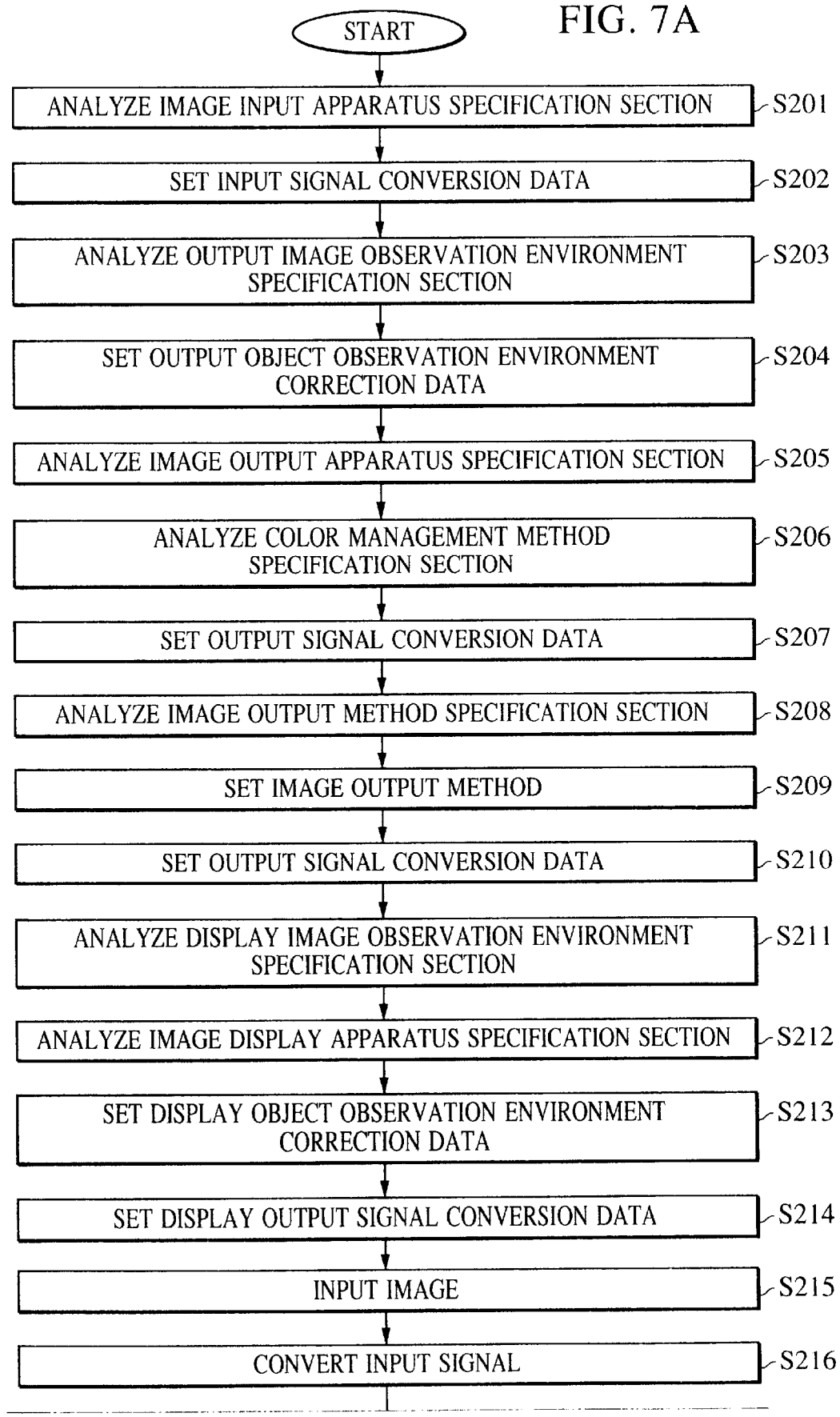
FIG. 7 is a flowchart of an operation during system execution.

Next, referring to FIG. 7, the operation during execution is described. When execution is selected, the system control section 111 begins to operate in accordance with the flowchart. In step S201, from the analysis of the image input apparatus specification section 118, the image input apparatus is specified. In step S202, input signal conversion data compatible with the image input apparatus is called from the input signal conversion data storage section 112 and set in the input signal conversion section 102. Next, in step S203, from the analysis of the output image observation environment specification section 123, the output image observation environment is specified. In step S204, a matrix XYZ2X'Y'Z' is called as the corresponding output object observation environment correction data from the output object observation environment correction data storage section 116 and set in the output object observation environment correction section 103. In step S205, the image output apparatus specification section 119 is analyzed, and the image output apparatus is specified. In step S206, a color management method specification section 122 is analyzed, and the color management method is specified. As the color management method, Perceptual, Relative, Colorimetric, Saturation, or Absolute Colorimetric is selected (see Inter-Color Profile Format ver. 3.0). Output signal conversion data is prepared for each of these methods. In step S207, the output signal conversion data specified by the image output apparatus and the color management method is selected from the output signal conversion data storage section 113 and set in the output signal conversion section 104. In step S208, the image output method specification section is analyzed so that it is determined whether it is an image output or an image display. In step S209, the determination result is set in the output method selection section 105. Next, in step S210, the output signal reverse-conversion data of the image output apparatus is read from the output signal reverse-conversion data storage section 114 and set in the output signal reverse-conversion section 107. In step S211, the display image observation environment specification section 124 is analyzed to specify the display observation environment. Next, in step S212, the image display apparatus specification section 120 is analyzed to specify the display apparatus. In step S213, by using the information of the display image observation environment and the output image observation environment and the display apparatus, as the display section observation environment correction data corresponding to this condition, the matrix X1Y1Z12X1'Y1'Z1' is selected from the display object observation environment correction data storage section 117 and set in the display object observation environment correction section 108.

In step S214, the display output signal conversion data of the image display apparatus is read from the display output signal conversion data storage section 115 and set in the display output signal conversion section 109.

After the above operation, the system control section 111 causes the image input section 101 to input an image, and the processing is started. Initially, in step S215, image signals RGB are read, and in step S216, based on the input signal conversion data set in step S202, the image signals RGB are converted into image signals XYZ which are not dependent upon the apparatus on the basis of equations (1) and (2) described above. In step S217, based on the output object observation environment correction data set in step S204, the image signals XYZ are converted into the image signals X'Y'Z' such that the output object observation environment is corrected on the basis of equation (3) described above. In step S218, based on the output signal conversion data set in step S207, the image signals X'Y'Z' is converted into output image signals CMY on the basis of equation (4) described above. In step S219, a determination is made of the output method. When the output determination has been made, the process proceeds to step S202 where the output image signals CMY are sent to the image output section 106 and the image is output, and this operation is terminated. In the case of the display determination in step S219, the process proceeds to step S221 where, based on the output signal reverse-conversion data set in step S210, the output image signals CMY are converted into image signals X1Y1Z1 which are not dependent upon the apparatus on the basis of equation (5) described above. In step S222, based on the observation environment correction data set in step S213, the image signals X1Y1Z1 are converted into the image signals X1'Y1'Z1' in which correction is performed for the observation environment on the basis of equation (6) described above. In step S223, based on the display output signal conversion data set in step S214, the image signals X1'Y1'Z1' are converted into the image signals R1G1B1 which are dependent upon the display apparatus on the basis of equations (7) and (8) described above. Then, in step S224, the image signals R1G1B1 are sent to the image display section 110 where the image is displayed, and the process terminates. When these operations are terminated, the process returns to the operation of the user interface.

Since the above-described operations are performed by using the system described in this embodiment, and since the output object observation environment correction means, and the display object observation environment correction means are provided while designing a user interface, it is possible to obtain an output object which gives the same appearance as that observed under the standard light source regardless of the output object observation environment. Furthermore, even in an environment different from a light source in an environment in which an output object is expected to be observed, it is possible to obtain an output object which gives the same appearance as that observed under the expected environment.

Furthermore, when obtaining a display object which gives the same appearance as that of an output object, first, conversion is performed on the basis of the spectroscopic characteristics of the output object observation environment light and then chromatic adaptation prediction is performed on the basis of the display object observation environment and the reference white during display object observation, obtained from the white of the display apparatus, making it possible to perform satisfactory signal conversion in which the spectroscopic characteristics of the observation environment and the chromatic adaptation characteristics (the fact that the reference white during display object observation is affected by both the white of the display screen and the white of the ambient light) of the observer are taken into consideration.

Although in the above-described embodiment Von. Kries's theorem is used as a chromatic adaptation prediction theorem, other chromatic adaptation prediction theorems may be used. Also, the present invention can be applied to various hardware structures and sequence processes appropriate to this. These sequence processes are, for example, formed into logic or software. Or, these sequence processes may be formed into an algorithm in a range without departing from the spirit and scope of the present invention, and can be applied as hardware or an apparatus in accordance with this algorithm.

Also, this embodiment may be used for a copying machine, a printer, and the like having a preview function such that an image to be printed is displayed on a monitor in advance.

Second Embodiment

Figure 8:
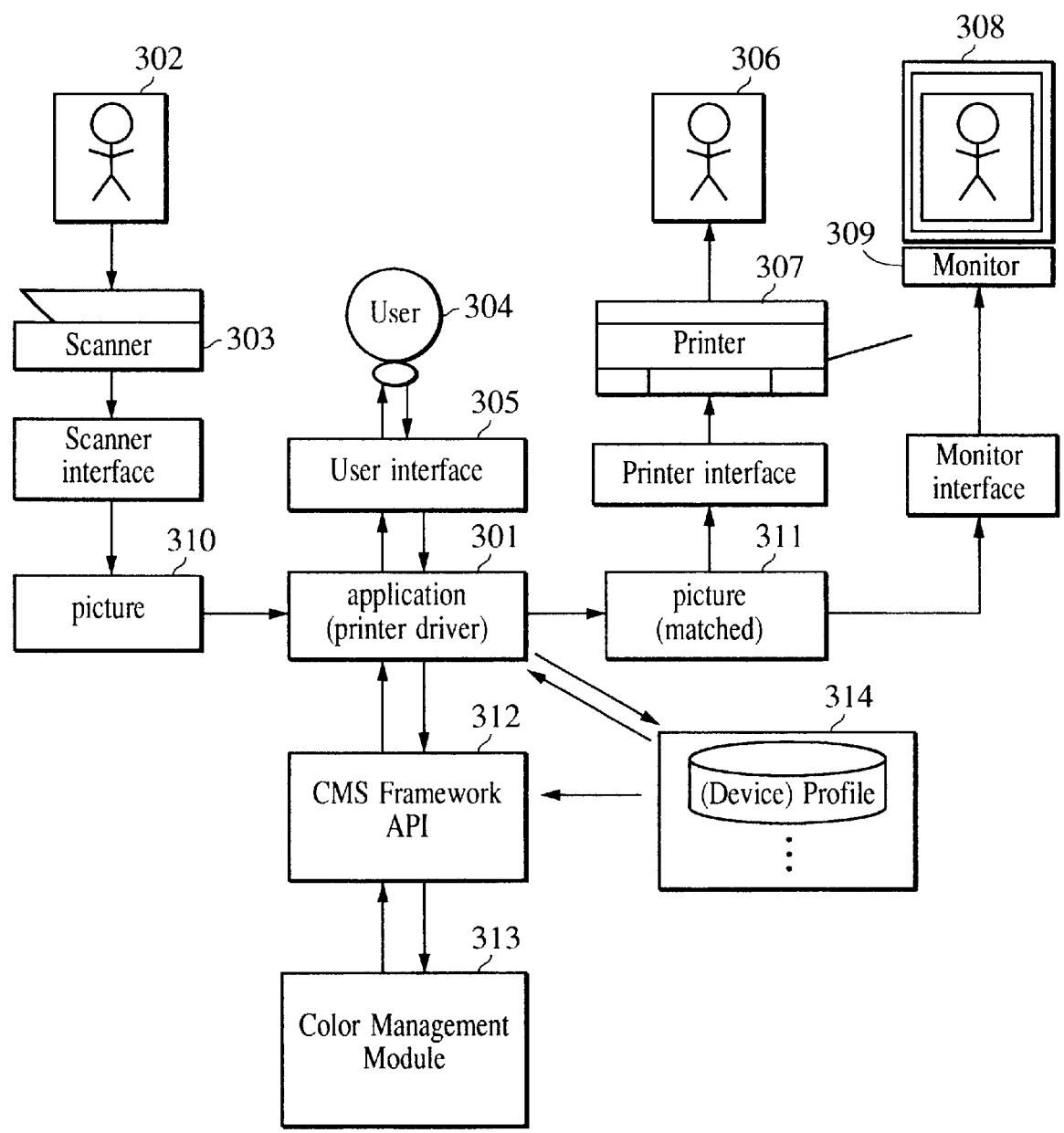
FIG. 8 shows a system of a construction in which a CMS framework API is used.

As a second embodiment, a description will be given of the construction in which framework API of a color management system (CMS) which is prepared at the OS level of a computer is used, as shown in FIG. 8. FIG. 8 is a system diagram conceptually showing the construction in which the present invention is performed by using a CMS framework API. An application (printer driver) 301 controls the display and data input of a user interface 305, and obtains the instruction from a user 304 and controls a scanner 303, a printer 307, and a monitor 309 through each device interface, and further, communicates with a CMS framework API 312 and a profile group 314 in order to control the operation of this system.

The user interface 305 has a screen shown in FIG. 5A, and sub-screens shown in FIGS. 5B and 5C, and obtains necessary information from the user 304. The sub-screen of FIG. 5B is displayed by selecting the SELECT button in the output image observation environment selection column of the main screen. The user specifies environment light under the output image observation environment through this screen. The sub-screen of FIG. 5C is displayed by selecting the SELECT button in the display image observation environment selection column of the main screen. The user specifies environment light under the display image observation environment through this screen. The user specifies the scanner 303 from the column of the input apparatus of the main screen of FIG. 5A, the printer 307 from the column of the output apparatus, and the monitor 309 from the column of the display apparatus. Furthermore, the image output method is specified by selecting the OUTPUT button or the DISPLAY button of the column of the image output method. Then, a color management method (Perceptual, Relative, Colorimetric, Saturation, Absolute Colorimetric) is specified through the column of the color management method. The user specifies the observation environment of the output image through the column of the output image observation environment. When a DEFAULT button is selected, observation environment light held beforehand by the system is specified. When the SELECT button is selected, the observation environment is as described above. The user specifies the observation environment of the display image through the column of the display image observation environment. The operation during button selection is the same as in the output image observation environment. In the screen, in the display column of the downward arrow, a plurality of selection items are prepared beforehand. When the downward arrow is selected, a list thereof is displayed. A selection is made by specifying a corresponding item in the list.

The scanner 303 causes a document image 302 to be input as image data 310 to the system in accordance with an instruction of the application 301. The printer 307 outputs image data 311 processed by the system as a printed image 306 similarly in accordance with an instruction of the application 301. In a similar manner, the monitor 309 displays the processed image data 311.

The CMS framework API 312 is called from the application 301, and the CMS framework API 312 calls a necessary profile from the profile group 314 in accordance with the operation command from the application 301, further reads the image data 310, passes the data to a color management module 313, receives the processed result, and then returns it to the application 301.

The color management module 313 is called from the CMS framework API, processes the image data by using the received image data and the profile in accordance with the operation command, and returns the result to the CMS framework API.

The profile group 314 is prestored in a memory within the system, and a corresponding profile is read from the CMS framework API 312. The profile group 314 is made up of a plurality of various profiles of a scanner profile, a printer profile, and a monitor profile.

Figure 37:
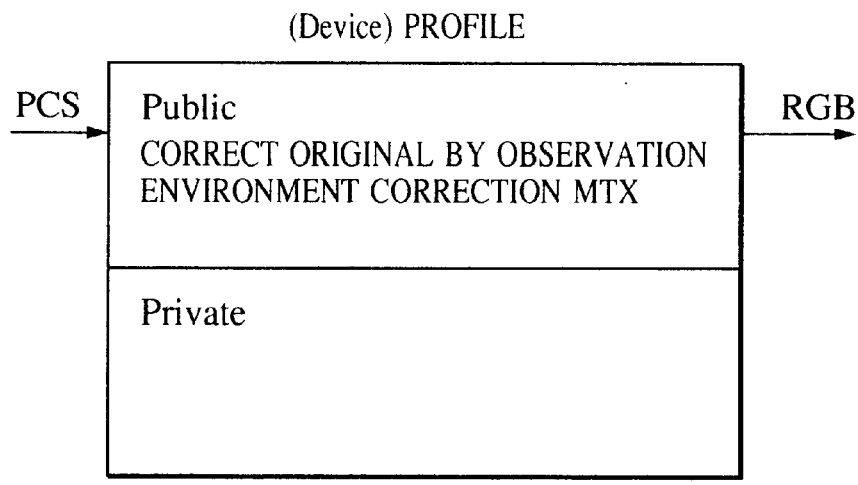
FIG. 37 shows a profile structure.
Figure 38:
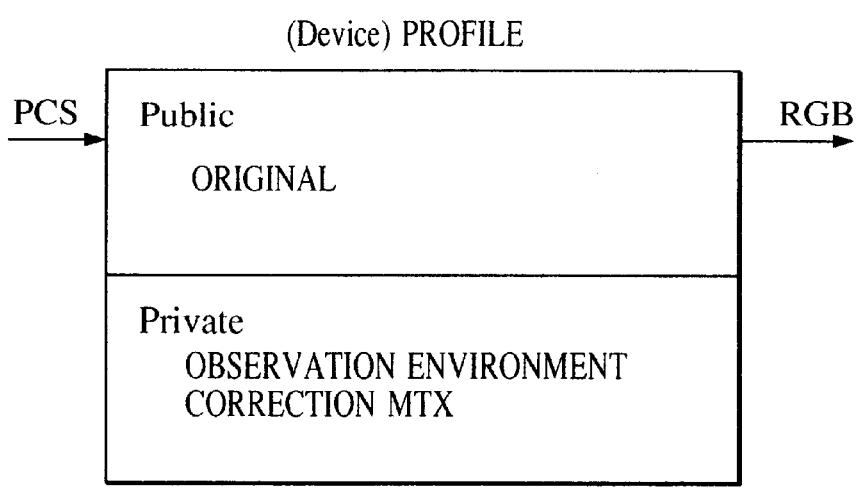
FIG. 38 shows a profile structure.

The application 301 corrects the profile of a corresponding input device within the profile group 314 in such a manner as to include the observation environment information by using the input device information and the output image observation environment light information obtained through the user interface 305. In this embodiment, as a method of correcting the profile, two kinds of methods shown in FIGS. 37 and 38 are used. In the case of FIG. 37, a matrix that converts an input device signal into a standard color-space signal, described in the public region, $MTX_{RGB2XYZ}$ described in the first embodiment, is replaced with $XYZ2X'Y'Z' \cdot MTX_{RGB2XYZ}$ such that the same output image observation environment correction matrix XYZ2X'Y'Z' is matrix-multiplexed thereby, and is newly entered as an output image observation environment correction input device profile in the profile group 314. In the case shown in FIG. 38, the output image observation environment correction matrix XYZ2X'Y'Z' is added to the private region, thereby it is replaced with the profile before being corrected as an input device profile containing the output image observation environment correction information. In this case, the correction profile can be used as a profile before being corrected because the information of the public region is stored.

Furthermore, the application 301 corrects the profile of the corresponding display device within the profile group 314 in such a manner as to contain the observation environment information by using the display device information, the output image observation environment light information, and the display image observation environment light information obtained through the user interface 305. Also in this case, as a method of correcting the profile, two kinds of methods are used as shown in FIGS. 37 and 38. In the case shown in FIG. 37, a matrix $MTX_{X'Y'Z'2R1'G1'B1'}$, described in the public region and described in the first embodiment, that converts a standard color-space signal into a display device signal is replaced with $MTX_{RGB2XYZ} \cdot X1Y1Z12X1'Y1'Z1'$ such that the same display image observation environment correction matrix X1Y1Z12X1'Y1'Z1' is matrix-multiplexed thereby, and it is newly entered as a display device profile containing display image observation environment correction information in the profile group 314. In the case shown in FIG. 38, the output image observation environment correction matrix X1Y1Z12X'Y'Z' is added to the private region, thereby it is replaced with the profile before being corrected as a display device profile containing the output image observation environment correction information. In this case, the correction profile can be used as a profile before being corrected because the information of the public region is stored.

In either case, when the correction profile of the type of FIG. 37 is used, it can be used for the signal processing as it is when executing correction. On the other hand, in the case shown in FIG. 38, prior to performing correction, the correction profile must be used for signal processing after a synthesis process, such as that described in the case of FIG. 37, is performed for the matrix in the public region and the matrix in the private region.

Figure 9:
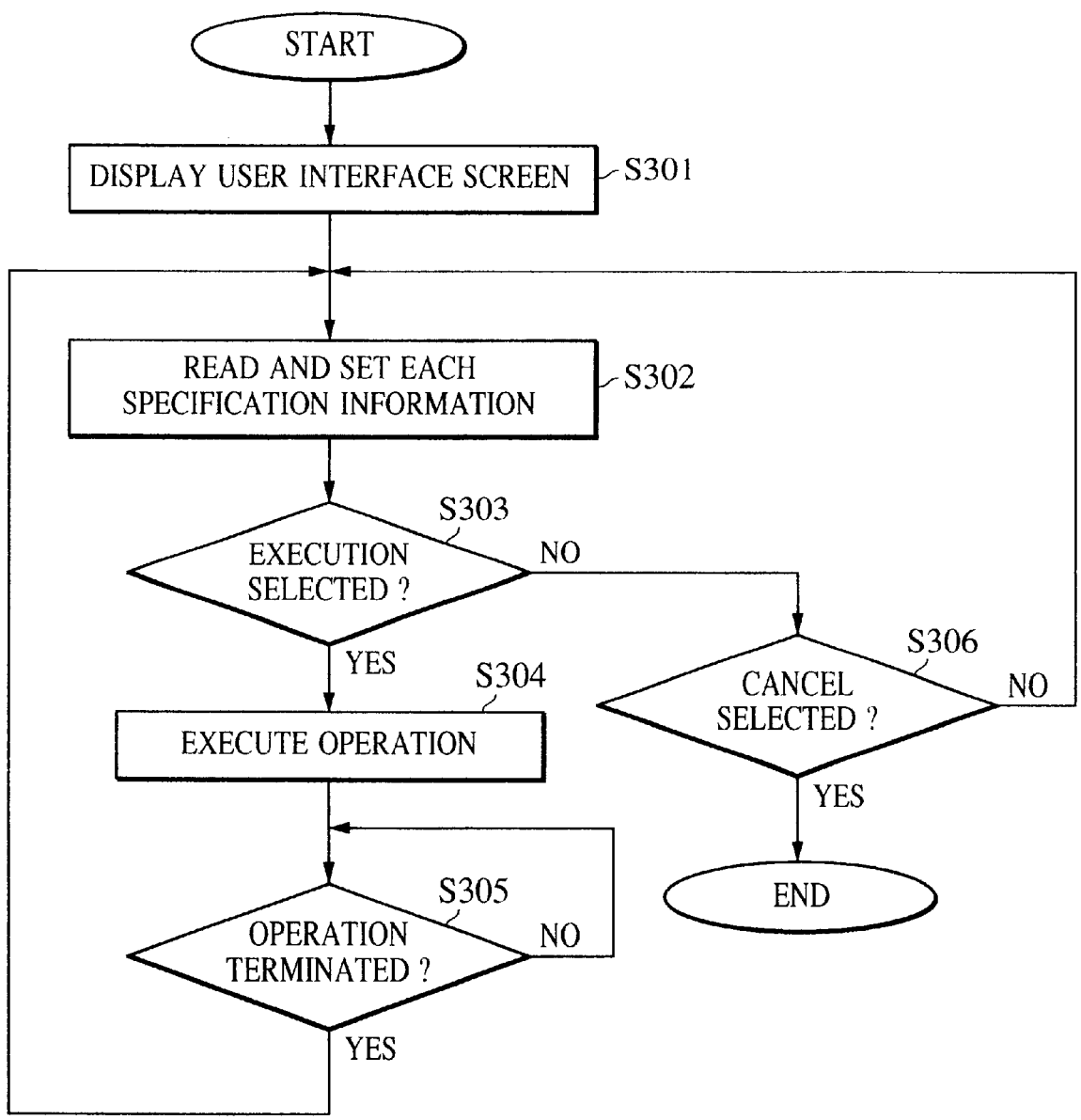
FIG. 9 is a flowchart of the operation of a user interface screen.

Next, the operation of this embodiment is described. FIG. 9 is a flowchart showing the operation of a user interface screen in the embodiment of this system. When the application 301 is accessed, in step S301, the user interface screen information shown in FIG. 5A is read, and it is displayed. In step S302, information specified by the user is input through the user interface screen, and in step S303, it is determined whether the EXECUTE button has been selected. When it is determined that the EXECUTE button has been selected, the process proceeds to step S304 where the process of the operation flowchart is performed. When it is determined that the execution button has not been selected, the process proceeds to step S306 where it is determined whether the CANCEL button has been selected. When it is determined that the CANCEL button has been selected, this system terminates, and the access to the application 301 is released. When it is determined that the CANCEL button has not been selected, the process returns to step S302. In step S305, a determination is made of the operation termination. When it is determined that the operation has been terminated, the process returns to step S302. When the operation has not been terminated, the system waits in a standby state in step S305 until the operation is terminated. The foregoing is the operation of the user interface of this system.

Figure 10B:
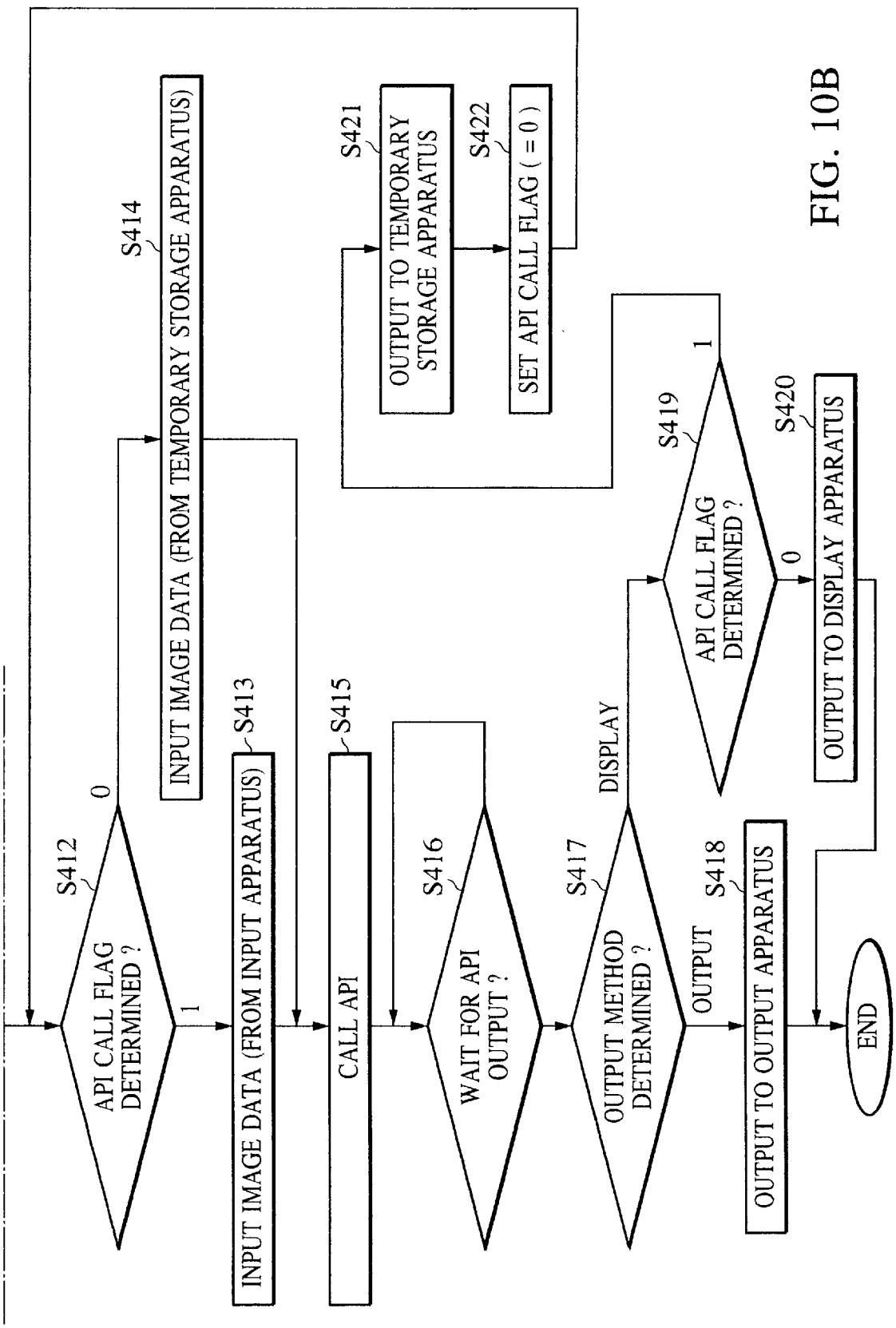
FIG. 10 is a flowchart of an application operation.

Next, referring to FIG. 10, the operation during execution is described. When execution is selected, the application 301 begins the operation of the flowchart. Initially, in steps S401, S402, and S403, the input apparatus, the output apparatus, and the display apparatus are specified through the user interface. Then, in step S404, a color management method is specified. In step S405, an output object observation environment is specified. Then, in step S406, the profile of the input device specified in step S401 is corrected as described earlier in such a manner as to correspond to the output object observation environment specified in step S405. In step S407, the output method is specified, and then a determination is made of the output method. When the output method is an output, the process proceeds to step S411. When, on the other hand, the output method is a display, the process proceeds to step S409. In step S409, the display object observation environment is specified. In step S410, the profile of the display apparatus specified in step S403 is corrected as described above on the basis of the display object observation environment specified in step S409 and the output object observation environment specified in step S405. In step S411, an API call flag that specifies the number of times that the CMS framework API 312 is called is set to "1". In step S412, a determination is made of the API call flag. When the API call flag is "1", the process proceeds to step S413, and when the API call flag is "0", the process proceeds to step S414. In step S413, image data is input from the scanner 303. In step S414, image data is read from the temporary storage device provided within the system. In step S415, the CMS framework API 312 is called. In step S416, a return from the CMS framework API 312 is awaited, and the process proceeds to step S417. In step S417, a determination is made of the output method again. When the output method is an output, the process proceeds to step S418 where the processed image data output from the CMS framework API 312 is sent to the printer 307 whereby the image data is output, and this operation is terminated. When, on the other hand, the output method is a display, the process proceeds to step S419 where a determination is made of the API call flag again. When the API call flag is "0", the process proceeds to step S420 where the processed image data output from the CMS framework API 312 is sent to the monitor 309 whereby the image data is displayed, and this operation is terminated. When, on the other hand, the API call flag is "1", the process proceeds to step S421 where the processed image data output from the CMS framework API 312 is output and stored to the temporary storage device (not shown). Then, in step S422, the API call flag is set to "0", and the process returns to step S412.

The foregoing is the operation in the application 301.

Figure 11:
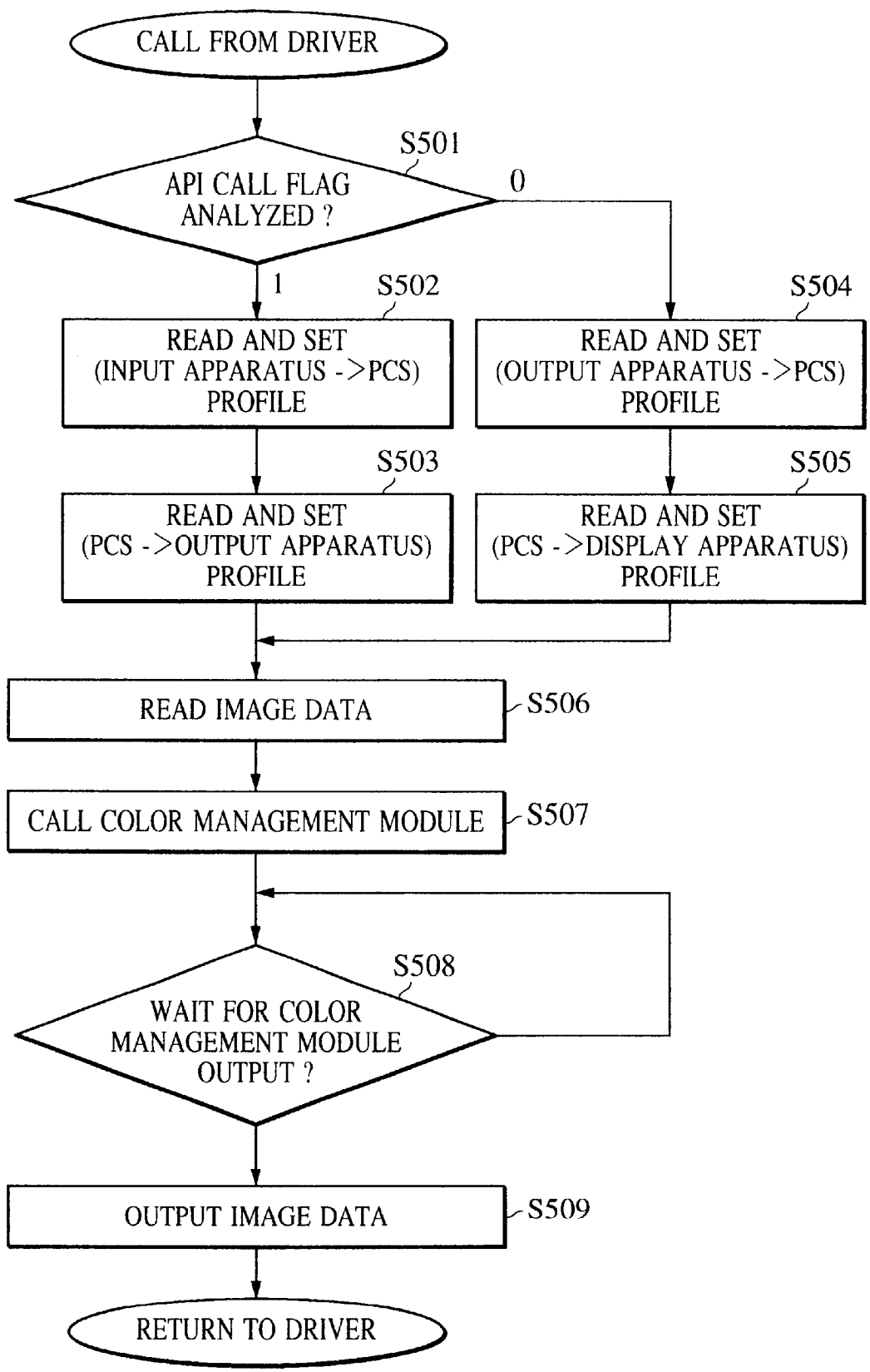
FIG. 11 is a flowchart of a CMS framework API operation.

Next, referring to FIG. 11, the operation when the CMS framework API 312 is called from the application 301 is described. When the CMS framework API 312 is called from the application 301, the CMS framework API analyzes the operation command from the application 301, and begins to operate in accordance with the operation command. The flowchart of FIG. 11 shows the operation command. When the CMS framework API is called from the application 301, initially, the CMS framework API analyzes the API call flag in step S501. When the API call flag is "1", steps S502 and S503 are performed, and the process proceeds to step S506. When, on the other hand, the API call flag is "0", steps S504 and S505 are performed, and the process proceeds to step S506. In step S502, the environment correction input device profile (input apparatus→PCS) is read from the profile group 314 and is set as a first profile. In step S503, an output apparatus profile (PCS→output apparatus) is read from the profile group 314 and is set as a second profile. In step S504, the output apparatus profile (output apparatus→PCS) is read from the profile group 314 and is set as a first profile. In step S505, an environment correction display apparatus profile (PCS→display apparatus) is read from the profile group 314 and is set as a second profile. Then, in step S506, image data is received from the application 301. In step S507, the color management module 313 is called. In step S508, a return from the color management module 313 is awaited, and the process proceeds to step S509. In step S509, the processed image data of the output result from the color management module 313 is output to the application 301, and the operation is terminated.

The foregoing is the operation in the CMS framework API 312.

Figure 12:
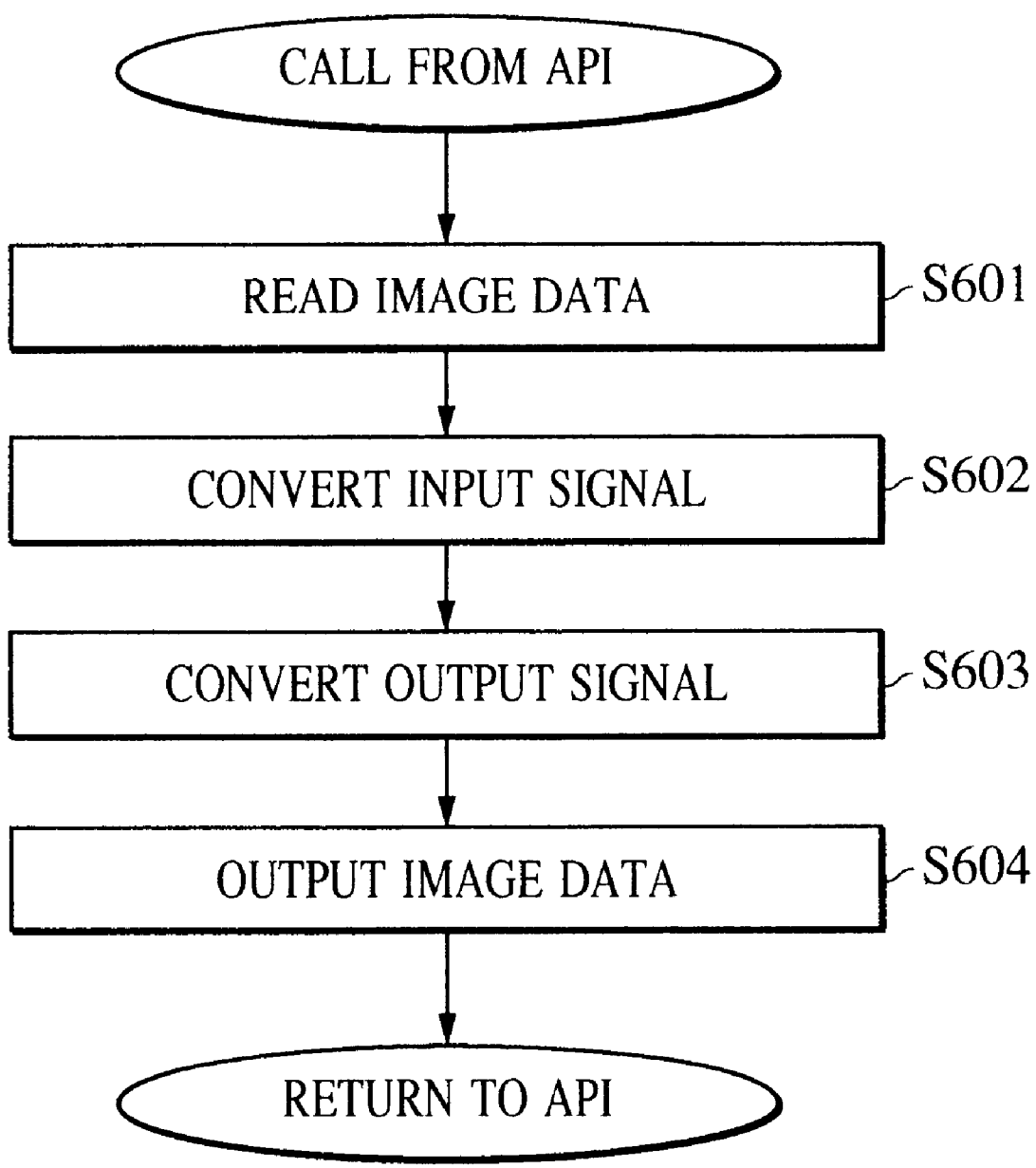
FIG. 12 is a flowchart of a color management module operation.

Next, referring to FIG. 12, the operation when the color management module 313 is called from the CMS framework API 312 is described. When the color management module 313 is called from the CMS framework API 312, the color management module 313 analyzes the operation command from the CMS framework API 312, and begins to operate in accordance with the operation command. The flowchart of FIG. 12 shows the operation command. When the color management module 313 is called from the CMS framework API, initially, the color management module receives image data from the CMS framework API in step S601. Then, in step S602, first signal conversion is performed using the first profile. In step S603, second signal conversion is performed using the second profile. In step S604, the processed image data is output to the CMS framework API, and the operation is terminated.

Since the input apparatus profile and the display apparatus profile have already been subjected to observation environment correction, in steps S602 and S603, when the API call flag is "1", the processes of equations (1), (2), (3), and (4), described in the first embodiment, are performed in sequence. When the API call flag is "0", the processes of equations (5), (6), (7), and (8), described in the first embodiment, are performed in sequence.

The foregoing is the operation in the color management module.

In the second embodiment, for simplification of the operation of the CMS framework API 312 and the color management module 313, the construction is formed such that the CMS framework API 312 is called two times. However, operation steps in the CMS framework API 312 and the color management module 313 may be increased in number so that the CMS framework API 312 is called once. Hereinafter, in a modification of the second embodiment, the processing is described according to this construction.

Also in this modification, the system to be used is the same as the system described thus far, and the system conceptual diagram is shown in FIG. 8. Furthermore, the operation of the user interface is the same as that of the above-described embodiment. Hereinafter, operation of the application 301, which is different from that of the above-described embodiment, is described.

Figure 16:
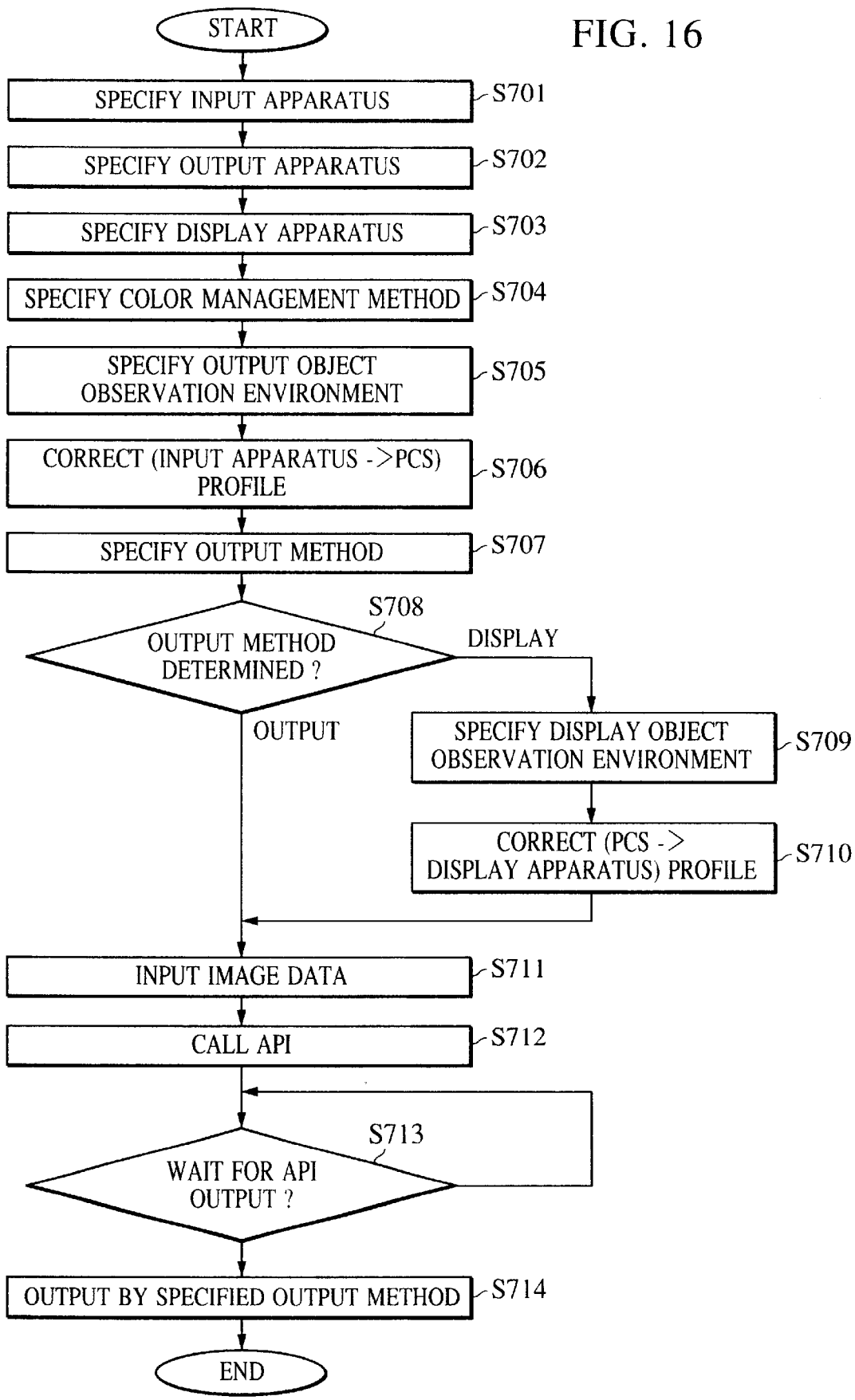
FIG. 16 is a flowchart of an application operation.

FIG. 16 is a flowchart showing the operation of the application 301 of this embodiment. When execution for an operation involved in the user interface is selected, the application 301 begins the operation of the flowchart shown in FIG. 16. In steps S701, S702, and S703, the input apparatus, the output apparatus, and the display apparatus are specified. In step S704, the color management method is specified. In step S705, the output object observation environment is specified. In step S706, the profile (input apparatus→PCS) of the input apparatus is corrected with respect to the output object observation environment in the same way as in the embodiment described earlier. In step S707, the output method is specified. In step S708, a determination is made of the output method. When the output method is an output, the process proceeds to step S711. When, on the other hand, the output method is a display, the process proceeds to step S709. In step S709, the display object observation environment is specified. In step S710, the profile (PCS→display apparatus) of the display apparatus is corrected in the same way as in the embodiment described above on the basis of the display object observation environment, the output object observation environment, and the display apparatus. In step S711, image data is input from the scanner 303. In step S712, the CMS framework API 312 is called. In step S713, a return from the CMS framework API 312 is awaited, and the process proceeds to step S714. In step S714, the processed image data output from the CMS framework API 312 is sent and output to the printer 307 in accordance with the specified output method, or the processed image data output is sent and displayed on the monitor 309, and this operation is terminated.

The foregoing is the operation in the application 301.

Figure 17:
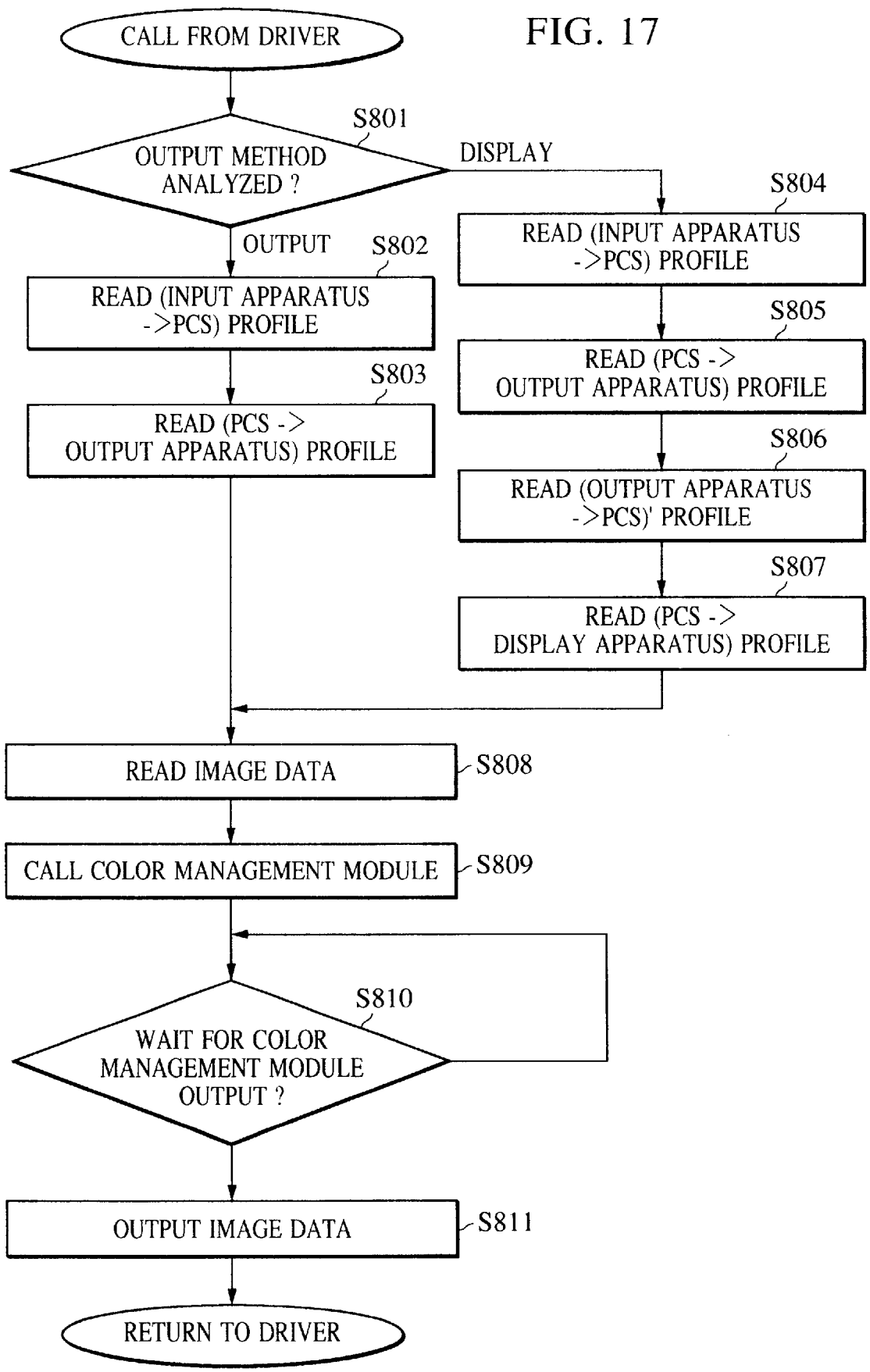
FIG. 17 is a flowchart of a CMS framework API operation.

Next, referring to FIG. 17, the operation when the CMS framework API 312 is called from the application 301 is described. When the CMS framework API is called from the application 301, the CMS framework API analyzes the operation command and begins to operate. When the CMS framework API is called from the application 301, the CMS framework API analyzes the output method. When the output method is an output, steps S802 and S803 are performed, and the process proceeds to step S808. When, on the other hand, the output method is a display, steps S804, S805, S806, and S807 are performed, and the process proceeds to step S808. In step S802, the correction input apparatus profile (input apparatus→PCS) is read from the profile group 314 and is set as a first profile. In step S803, the output apparatus profile (PCS→output apparatus) is read from the profile group 314 and is set as a second profile. In step S804, the correction input apparatus profile (input apparatus→PCS) is read from the profile group 314 and is set as a first profile. In step S805, the output apparatus profile (PCS→display apparatus) is read from the profile group 314 and is set as a second profile. In step S806, a reverse-output apparatus profile (output apparatus→PCS)' is read from the profile group 314 and is set as a third profile. In step S807, a correction display apparatus profile (PCS→display apparatus) is read from the profile group 314 and is set as a fourth profile.

Then, in step S808, image data is received from the application 301. In step S809, the color management module 313 is called, and in step S810, a return from the color management module 313 is awaited, and the process proceeds to step S811. In step S811, the processed image data of the output result of the color management module 313 is output to the application 301, and the operation is terminated.

The foregoing is the operation in the CMS framework API 312.

Figure 18:
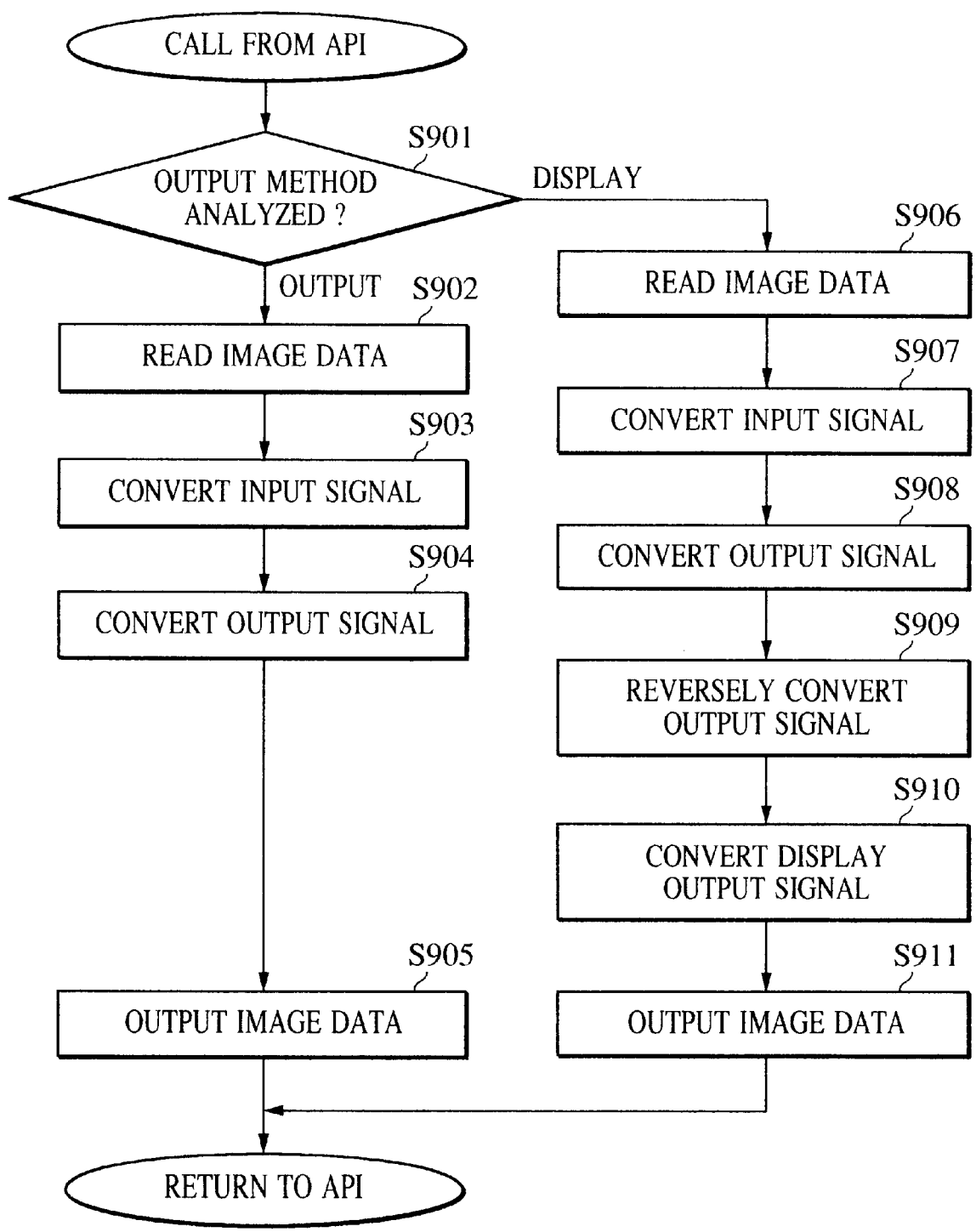
FIG. 18 is a flowchart of a color management module operation.

Next, referring to FIG. 18, the operation of the color management module 313 when the color management module 313 is called from the CMS framework API 312 is described. When the color management module 313 is called from the CMS framework API 312, the color management module 313 analyzes the operation command and begins to operate. The flowchart of FIG. 18 shows the operation command. When the color management module 313 is called from the CMS framework API 312, the color management module 313 analyzes the output method in step S901. If the analysis result is an output, steps S902, S903, S904, and S905 are performed, and the operation is terminated. When, on the other hand, the analysis result is a display, steps S906, S907, S909, S910, and S911 are performed, and the operation is terminated.

In step S902, image data is received from the CMS framework API. In step S903, first signal conversion is performed using the first profile. In step S904, second signal conversion is performed using the second profile. In step S905, the processed image data is output to the CMS framework API. In steps S903 and S904, the processes of equations (1), (2), (3), and (4), described in the first embodiment, are performed in sequence.

Meanwhile, in step S906, image data is received from the CMS framework API. In step S907, first signal conversion is performed using the first profile. In step S908, second signal conversion is performed using the second profile. In step S909, third signal conversion is performed using the third profile. In step S910, fourth signal conversion is performed using the fourth profile. In step S911, the processed image data is output to the CMS framework API. In steps S907, S908, S909, and S910, the processes of equations (1), (2), (3), (4), (5), (6), (7), and (8), described in the first embodiment, are performed in sequence.

The foregoing is the operation in the color management module (color gear).

According to the above-described embodiment, the profiles of the input apparatus and the display apparatus are corrected in advance using the observation environment information, and during signal processing execution, signal conversion is performed using the correction profile. Therefore, it is possible to perform color correction in accordance with the above-described observation environment light by using the framework API of the color management system (CMS) as it is, which is prepared at the OS level of the computer.

Furthermore, the profile data used for the observation environment correction process can be managed efficiently in a systematic manner.

Third Embodiment

Figure 19:
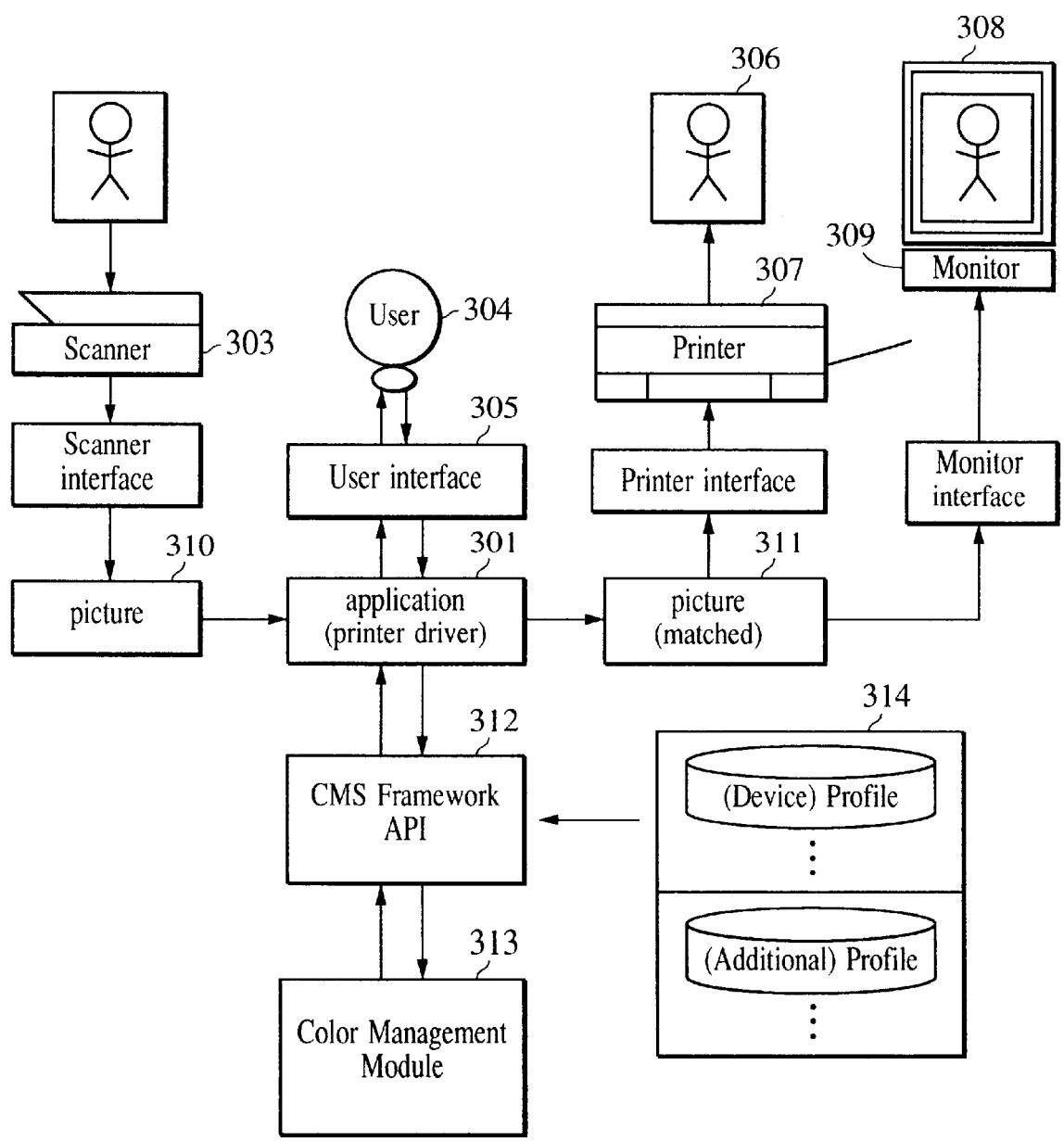
FIG. 19 shows a system of a construction in which a CMS framework API is used.
Figure 39:
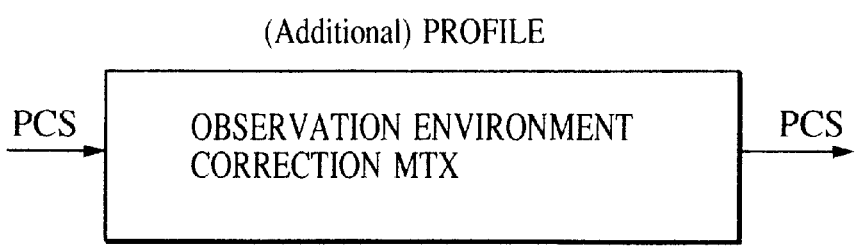
FIG. 39 shows a profile for storing environment-light correction data.

As shown in FIG. 19, another embodiment may be worked in such a way that an observation environment profile is prepared as an additional profile separately from the device profile of the input apparatus profile, the output apparatus profile, and the display apparatus profile, and the observation environment profile is called individually along with the input apparatus profile, the output apparatus profile, and the display apparatus profile. An example of the observation environment profile is shown in FIG. 39. The contents of this observation environment profile are the output object observation environment correction matrix XYZ2X'Y'Z' and the display object observation environment correction matrix X1Y1Z12X1'X1'Y1'Z1', which are described in the first embodiment.

Figure 13B:
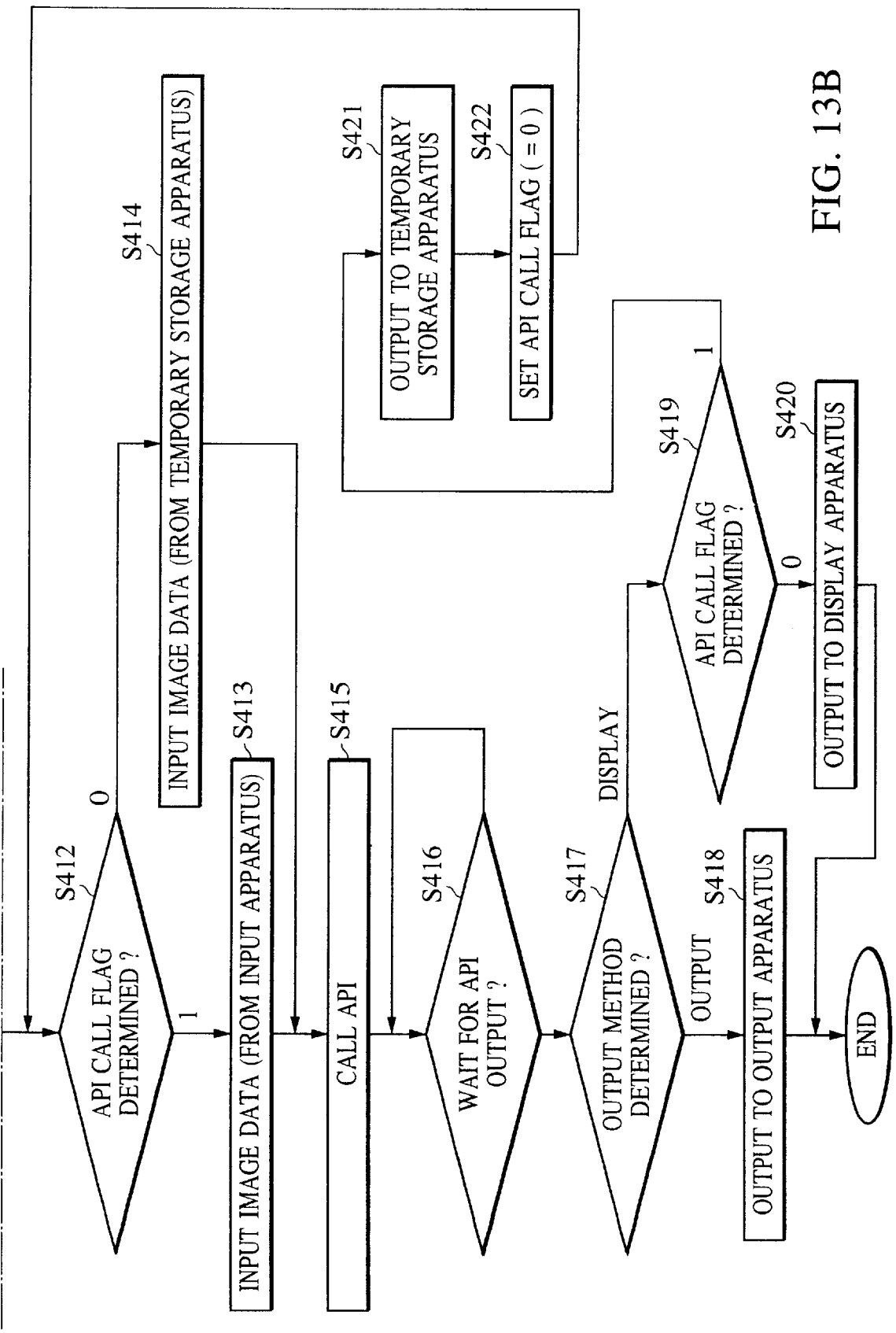
FIG. 13 is a flowchart of an application operation.
Figure 14:
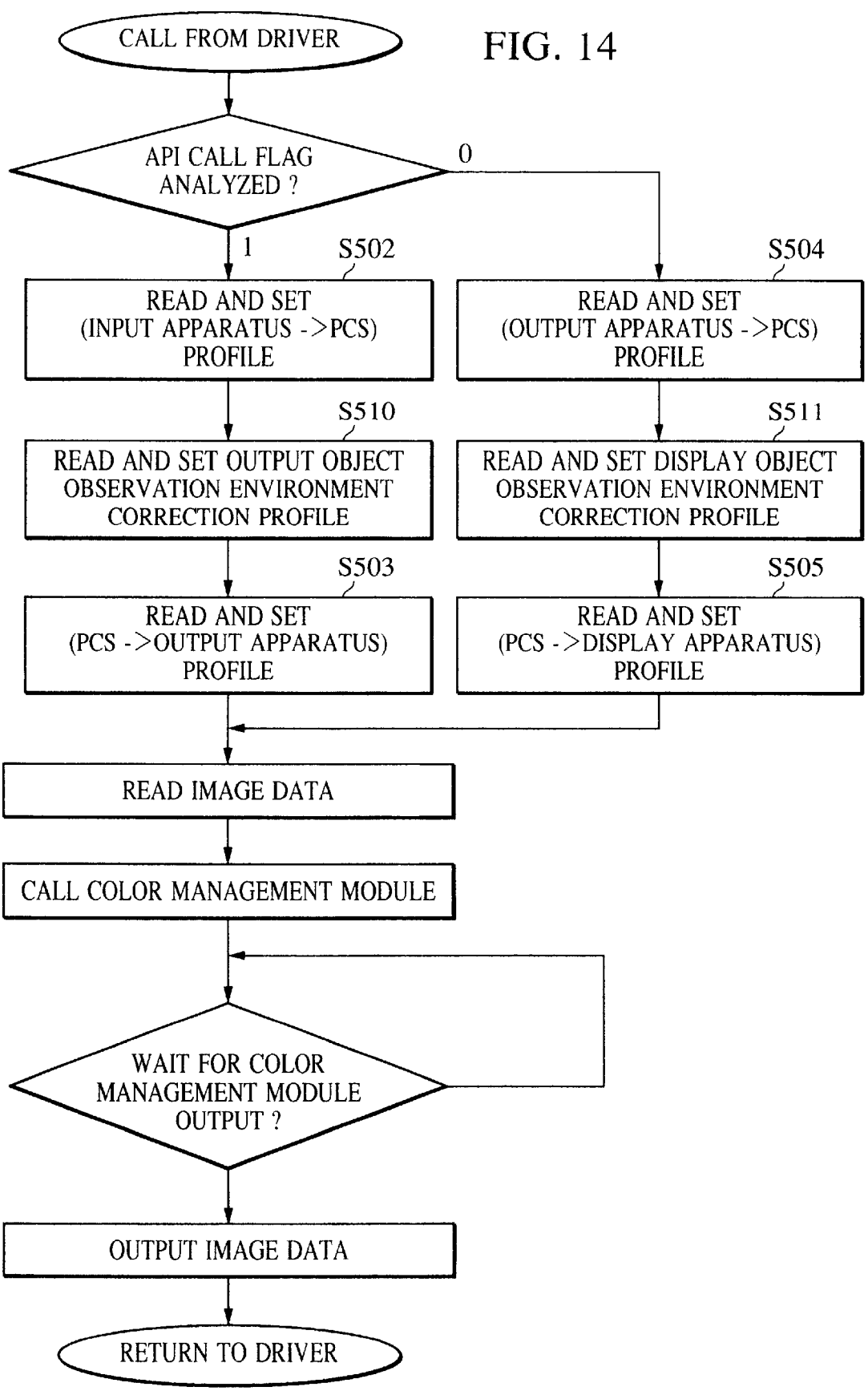
FIG. 14 shows a system of a construction in which a CMS framework API is used.
Figure 15:
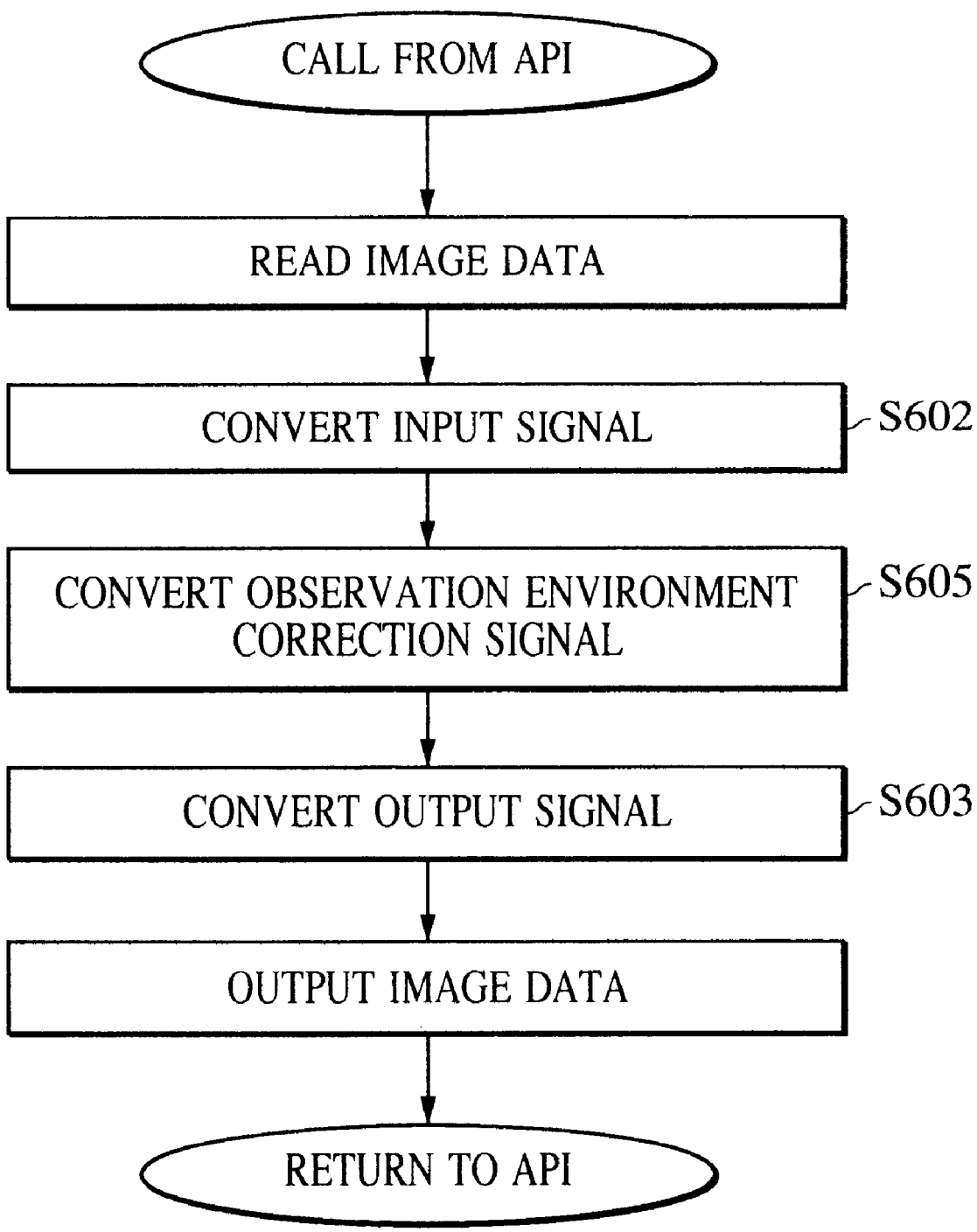
FIG. 15 is a flowchart of a color management module operation.

FIGS. 13, 14, and 15 show the flowchart of the operation of the above-described construction. The basic operation is the same as that of the second embodiment, and accordingly, points that are different are described mainly. Unless otherwise particularly explained, the operation is the same as that of the second embodiment. Initially, referring to FIG. 13, the points of the operation of the application that are different are described. In this embodiment, it is possible to omit the step (S406) of the second embodiment, the means and the step (S410) for correcting the input apparatus profile in accordance with the observation environment, and the means for correcting the display apparatus profile in accordance with the observation environment.

Next, referring to FIG. 14, different points of the operation of the CMS framework API are described. Here, a process is newly added. Between S502 and S503 of the first example of the second embodiment a process S510 is added in which an output object observation environment correction profile is read from the profile group 314 and is set as a third profile. Between S504 and S505 a process S511 is added in which a display object observation environment correction profile is read from the profile group 314 and is set as a third profile.

Finally, referring to FIG. 15, different points of the operation of the color management module are described. Also in this case, a process is newly added. More specifically, a process S605 for performing third signal conversion by using the third profile in order to perform observation environment correction is added between steps S602 and S603 of the second embodiment. In steps S602, S605, and S603, when the API call flag is "1", the processes of equations (1), (2), (3), and (4), described in the first embodiment, are performed in sequence. Also, when the API call flag is "0", equations (5), (6), (7), and (8), described in the first embodiment, are performed in sequence.

In this embodiment, similarly to the second embodiment, operation steps in the CMS framework API 312 and the color management module 313 may be increased in number so that the color management module 313 is called once. Hereinafter, in a modification of the third embodiment, an embodiment according to this construction is described.

Figure 20:
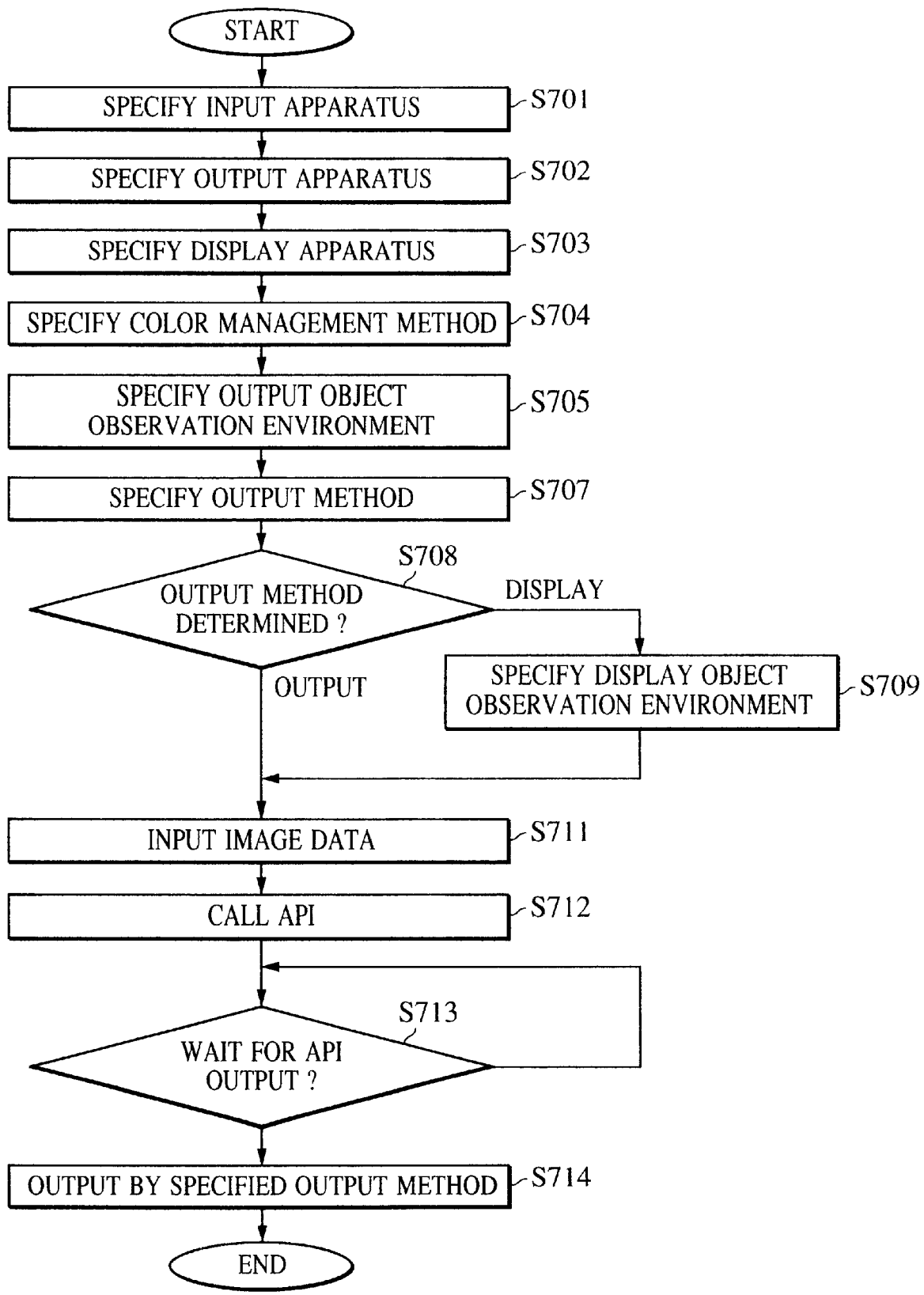
FIG. 20 is a flowchart of an application operation.
Figure 21:
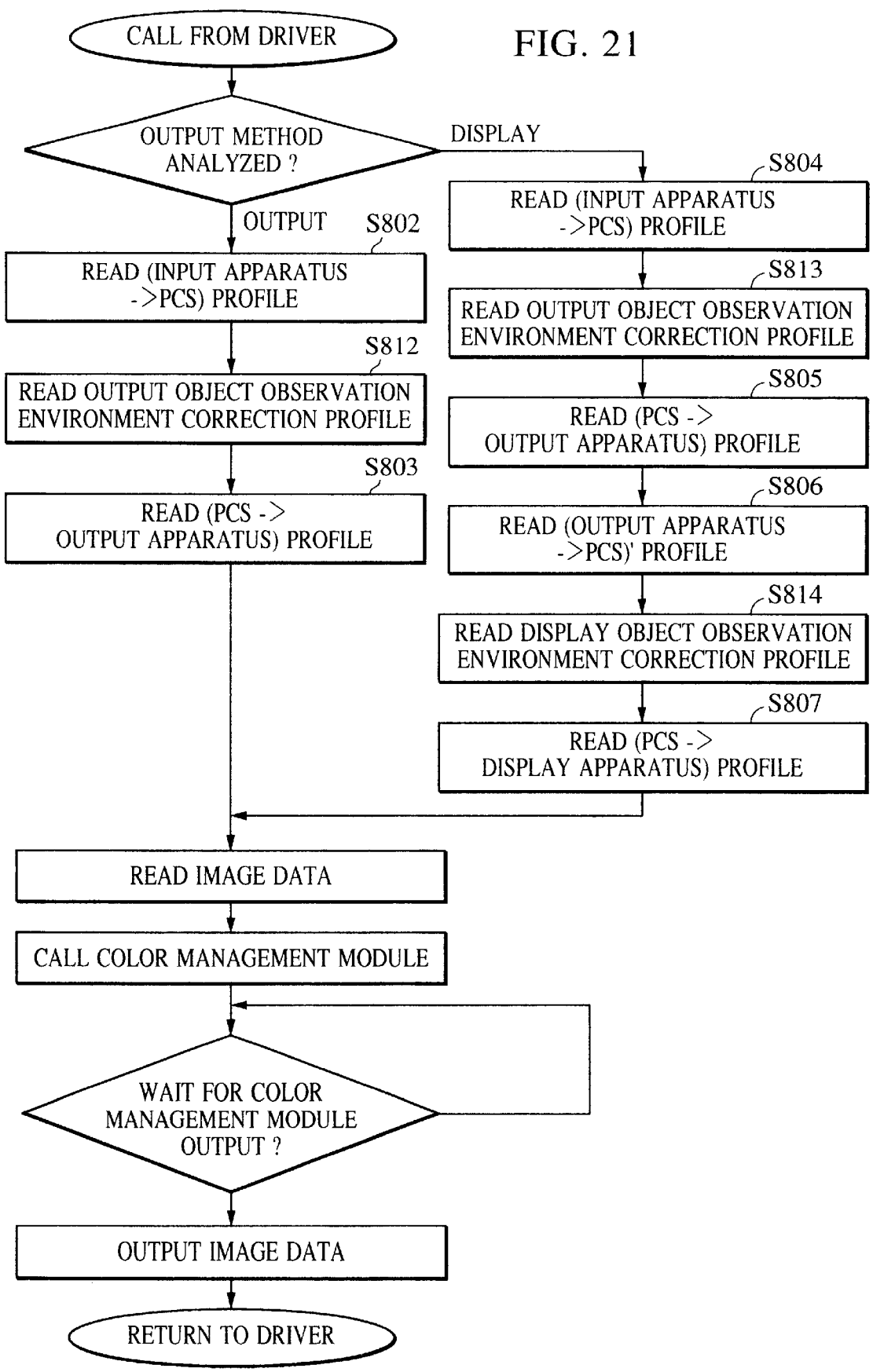
FIG. 21 is a flowchart of a CMS framework API operation.
Figure 22:
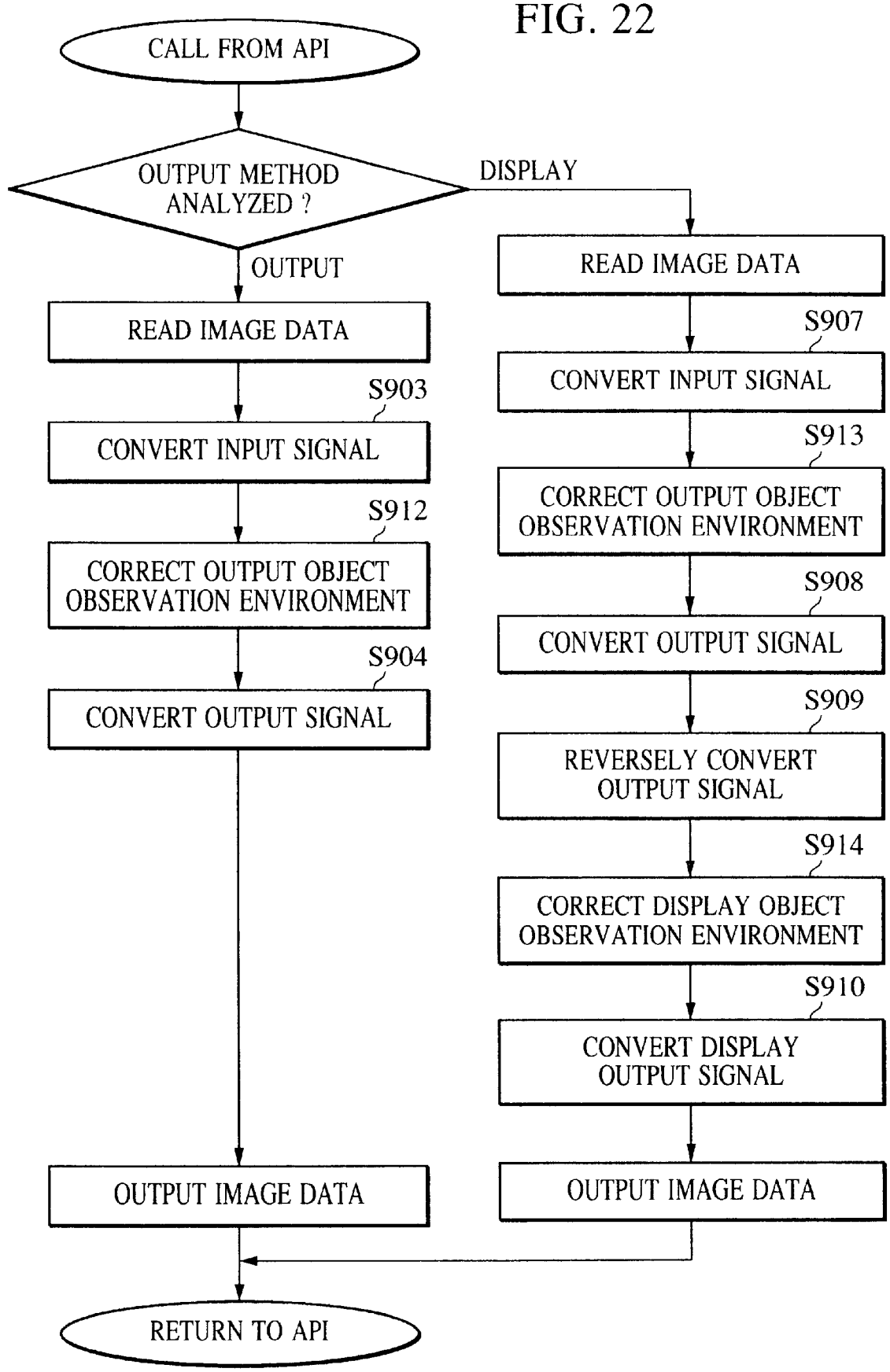
FIG. 22 is a flowchart of a color management module operation.

FIGS. 20, 21, and 22 show the operation flowchart of the above-described embodiment. The basic operation is the same as the operation described in the modification of the second embodiment. Hereinafter, points that are different are described. Unless otherwise particularly explained, the operation and the construction are the same as those of the modification of the second embodiment. Initially, referring to FIG. 20, different points of the operation of the application are described. Step S706 of the modification of the second embodiment, the means for correcting the input apparatus profile in accordance with the observation environment, and step S710 and the means for correcting the display apparatus profile in accordance with the observation environment are omitted. Next, referring to FIG. 21, different points of the operation of the CMS framework API are described. Here, a process is newly added. More specifically, a process S812 for reading an output object observation environment profile from the profile group 314 and setting it as a fifth profile is added between steps S802 and S803 of the second embodiment of the second embodiment, and similarly, a process S813 for reading an output object observation environment profile from the profile group 314 and setting it as a fifth profile is added between steps S804 and S805. Furthermore, a process S814 for reading a display object observation environment profile from the profile group 314 and setting it as a sixth profile is added between steps S806 and S807.

Finally, referring to FIG. 22, different points of the operation of the color management module are described. Also in this case, a process is newly added. More specifically, a process S912 for performing fifth signal conversion using the fifth profile in order to perform output object observation environment correction is added between steps S903 and S904 of the modification of the second embodiment. Similarly, a process S913 for performing fifth signal conversion using the fifth profile in order to perform output object observation environment correction is added between steps S907 and S908. Furthermore, a process S914 for performing sixth signal conversion using the sixth profile in order to perform display object observation environment correction is added between steps S909 and S910. In steps S903, S912, and S904, processes of equations (1), (2), (3), and (4), described in the first embodiment, are performed in sequence. In steps S907, S913, S908, S909, S914, and S910, processes of equations (1), (2), (3), (4), (5), (6), (7), and (8), described in the first embodiment, are performed in sequence.

As a result of implementing the above changes, the present invention can be performed using the observation environment profile in a form that uses the framework API of the color management system (CMS) which is prepared at the OS level of a computer. As a result of the above, since the present invention may be embodied without performing profile correction, it is possible to perform desired signal processing at a high speed and with high accuracy by using a profile prepared beforehand.

Fourth Embodiment

In the above-described second and third embodiments, observation environment correction information is obtained using a CMS framework API by correcting a device profile or by preparing an observation environment profile.

Figure 23:
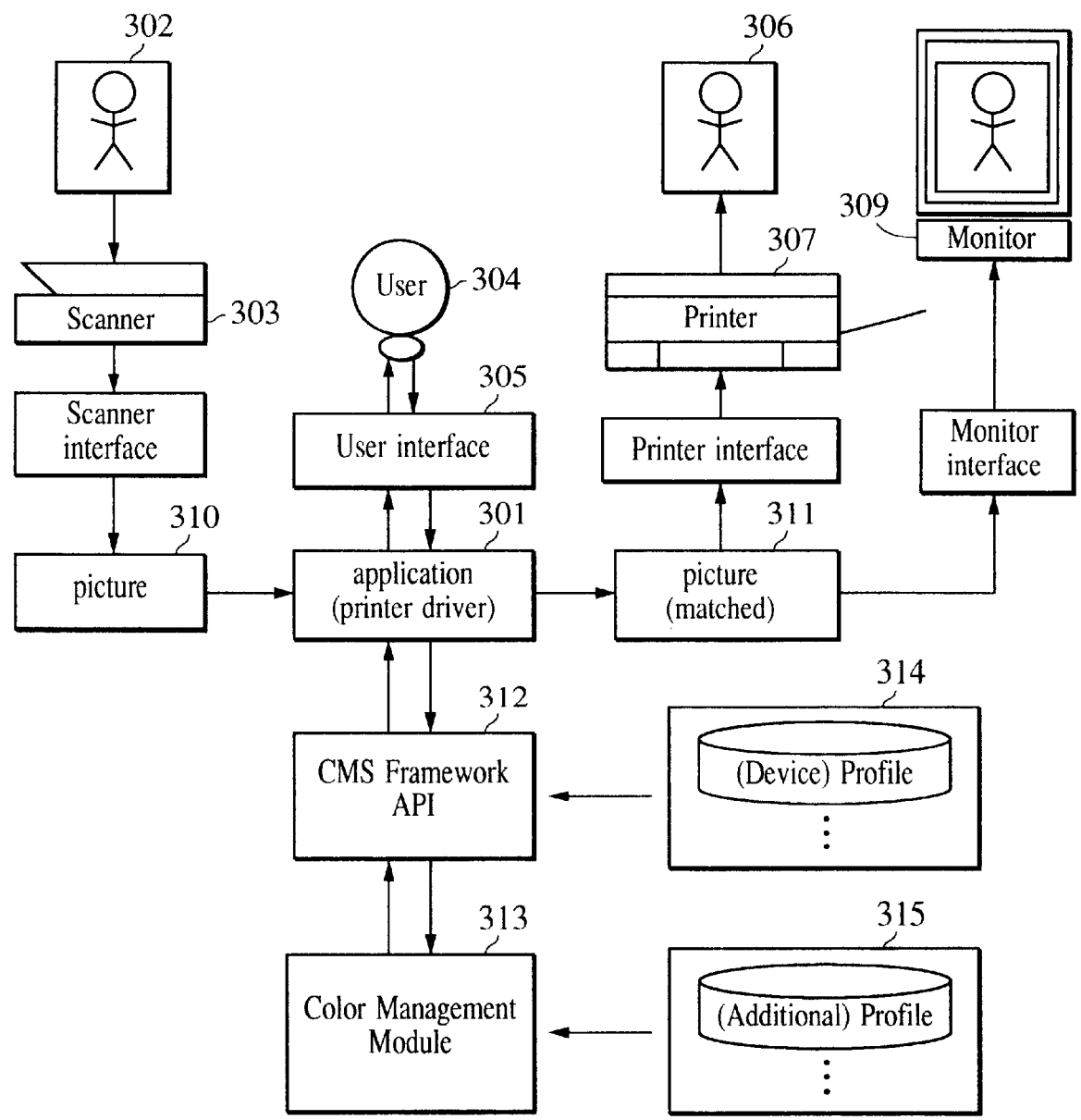
FIG. 23 shows a system of a construction in which a CMS framework API is used.

However, as shown in FIG. 23, a construction is possible in which the color management module directly obtains the observation environment information through the user interface. This makes it possible to perform color signal conversion by using a standard profile and further, a unique profile, and color-matching conversion can be performed with higher accuracy. An embodiment having the above construction is described below.

FIG. 23 is a system diagram of the construction in which the CMS framework API 312 is used, and further, a means for obtaining an observation environment correction profile is provided in the color management module 313.

The application (printer driver) 301 controls the user interface 305 in order to obtain an instruction from the user 304, controls the scanner 303, the printer 307, and the monitor 309 through each device interface, and further, controls the operation of this system while communicating with the CMS framework API 312.

The user interface 305 has a screen shown in FIG. 5A, and sub-screens shown in FIGS. 5B and 5C, and obtains information required for execution from the user 304. The sub-screen of FIG. 5A is displayed by the selection of the SELECT button in the output image observation environment selection column of the main screen, and a user specifies environment light in the output image observation environment through this screen. The sub-screen of FIG. 5B is displayed by the selection of the SELECT button in the display image observation environment selection column of the main screen, and the user specifies environment light in the display image observation environment through this screen. The user specifies the scanner 303 in the column of the input apparatus of the main screen of FIG. 5A, specifies the printer 307 in the column of the output apparatus, and specifies the monitor 309 in the column of the display apparatus. Furthermore, the image output method is specified by the selection of the OUTPUT button and the DISPLAY button in the column of the image output method, and the color management method (Perceptual, Relative, Colorimetric, Saturation, Absolute Colorimetric) is specified in the column of the color management method. The user specifies the observation environment of the output image through the column of the output image observation environment. When a DEFAULT button is selected, observation image environment light held beforehand by the system is specified. When the SELECT button is selected, the observation environment is as described above. The user specifies the observation environment light of the display image through the column of the display image observation environment. The operation is the same as in the column of the output image observation environment. In the screen, in the column of the downward arrow, a plurality of selection items are prepared beforehand. When the downward arrow is selected, a list thereof is displayed, and a corresponding item in the list is specified.

The user interface 305, in this embodiment, communicates with the color management module 313 so that data is exchanged and control is received.

The scanner 303 causes the document image 302 to be input as the image data 310 to the system in accordance with the instruction from the application 301. The printer 307 outputs the processed image data 311 as the image 306 in accordance with the instruction from the application 301. The monitor 309 displays the processed image data 311.

The CMS framework API 312 is called from the application 301, calls a required profile from the profile group 314 in accordance with the command from the application 301, and receives the image data 310 from the application 301, and then calls the color management module 313, passes the data thereto, receives the processed result, and returns it to the application 301.

The color management module 313 is called from the CMS framework API, processes the received image data by using a profile in accordance with the command from the CMS framework API, and returns the result to the CMS framework API. At this time, the color management module 313 performs observation environment correction, and selects the observation environment correction profile therefor from an observation environment profile group 315 through the user interface 305.

The profile group 314 is in the memory within the system beforehand, and a corresponding device profile is read from the CMS framework API 312. The contents of the profile group 314 are a plurality of various profiles of a scanner profile, a printer profile, and a monitor profile, and is a standard profile defined by the InterColor Profile Format ver. 3.0.

The observation environment profile group 315 is also in the memory within the system beforehand, and a corresponding device profile is read from the color management module 313. The contents of the profile group 315 are a plurality of observation environment correction profiles corresponding to each observation environment, and are the output object observation environment correction matrix XYZ2X'Y'Z' and the display object observation environment correction matrix X1Y1Z12X1'Y1'Z1', which are described in the first embodiment.

Next, the operation of this embodiment is described. The initial operation is the same as that of the second and third embodiments.

FIG. 9 is a flowchart showing the operation of a user interface screen. The operation is the same as that of the second and third embodiments.

Figure 24B:
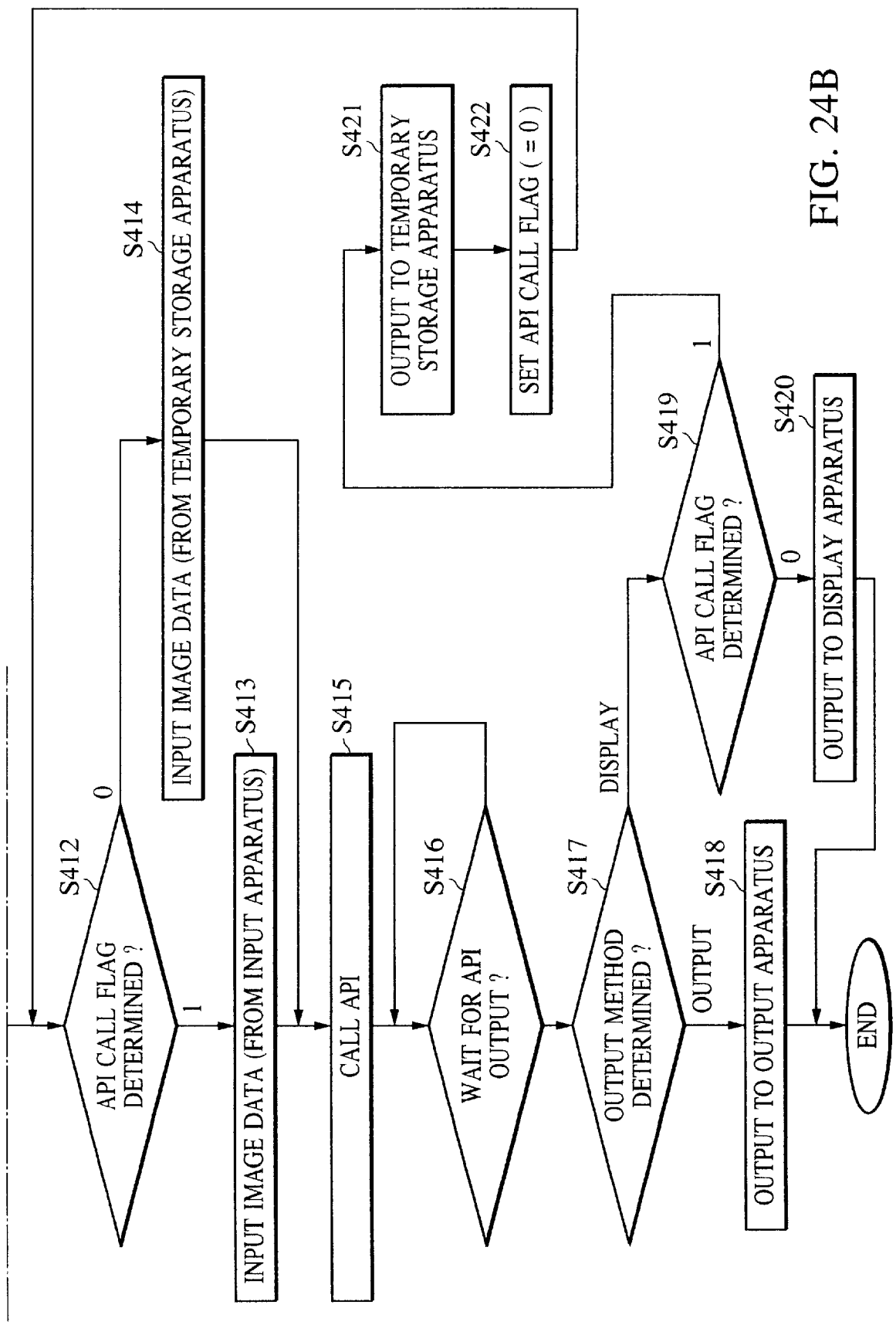
FIG. 24 is a flowchart of an application operation.
Figure 25:
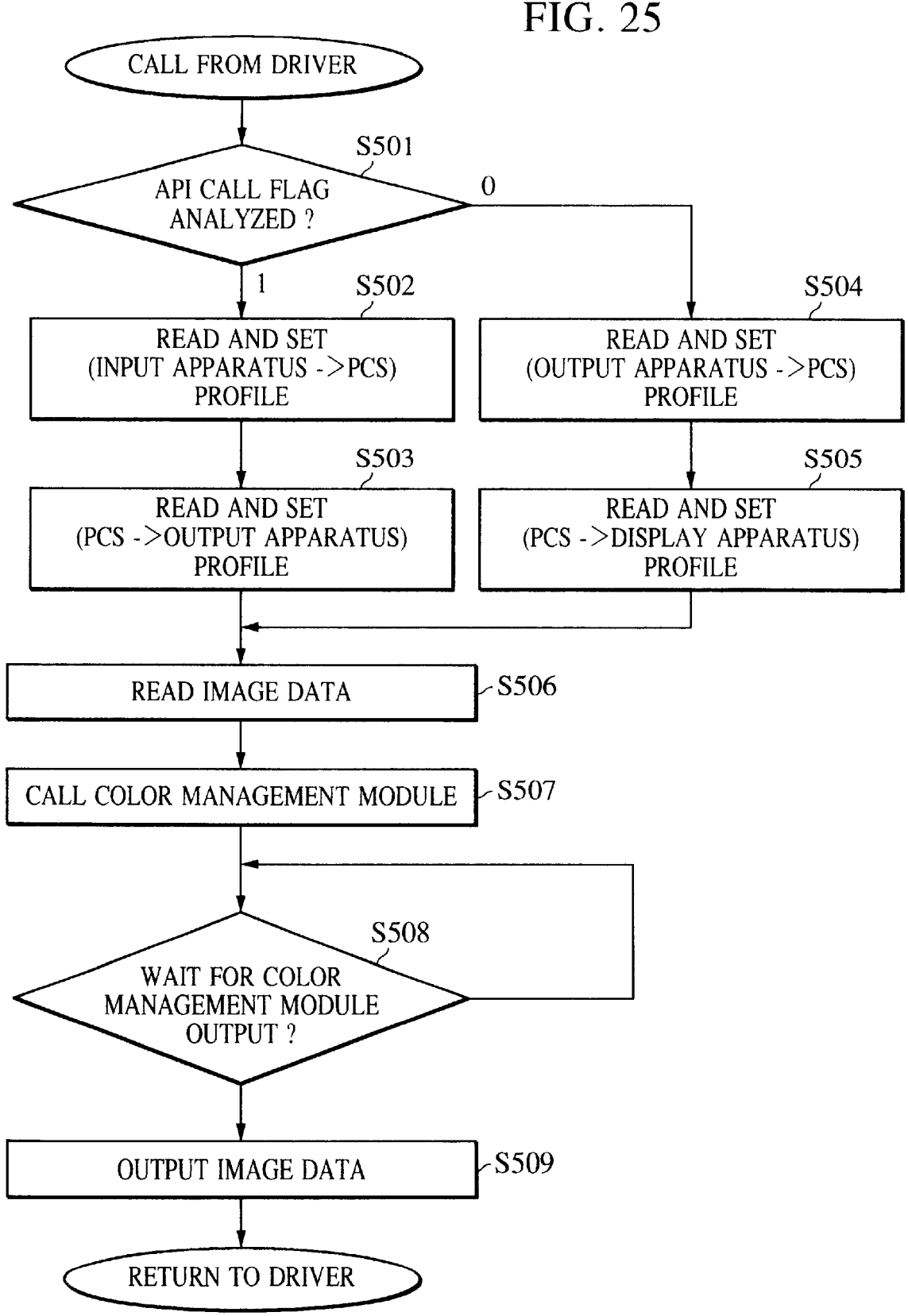
FIG. 25 is a flowchart of a CMS framework API operation.
Figure 26:
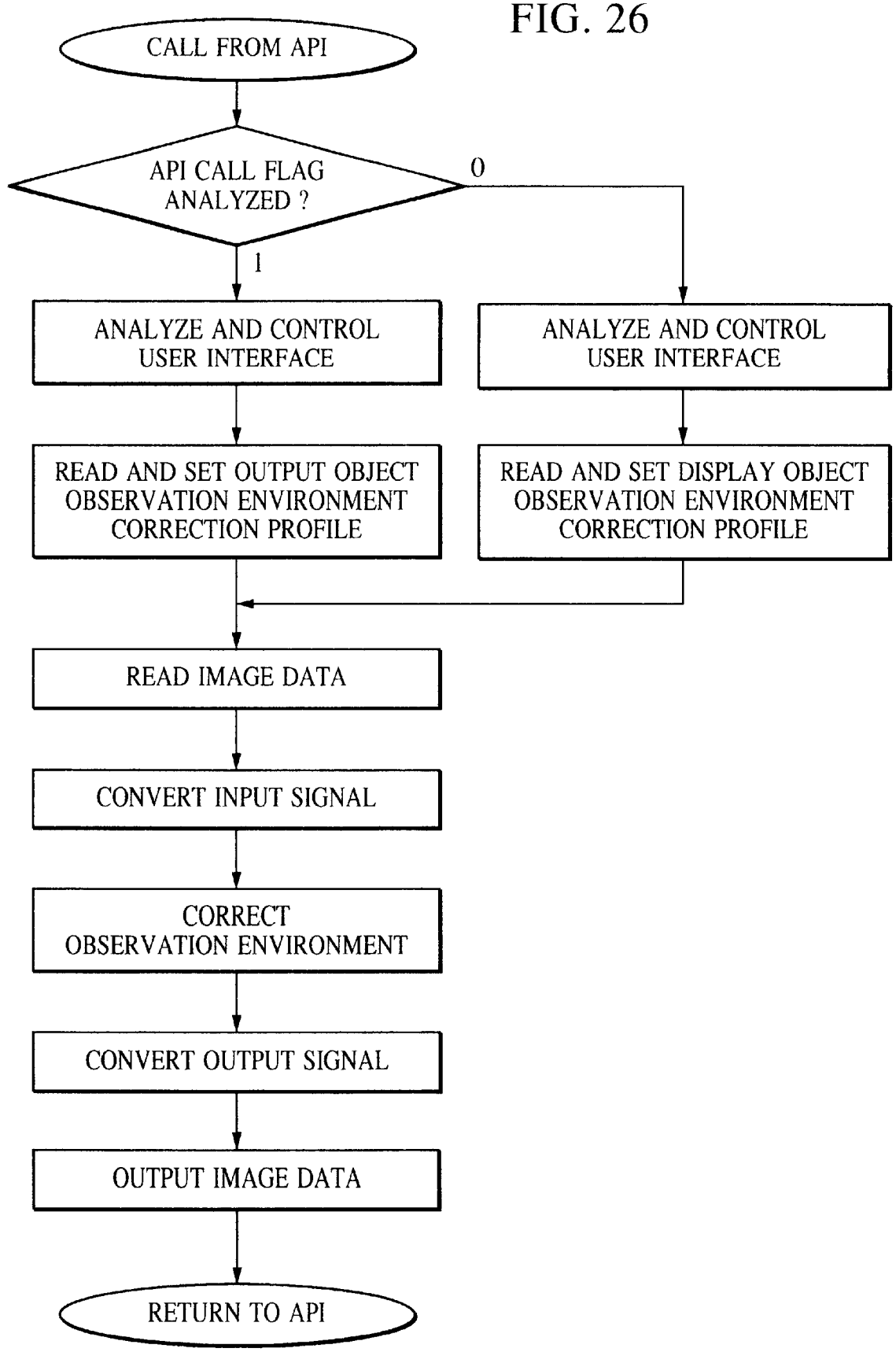
FIG. 26 is a flowchart of a color management module operation.

FIGS. 24, 25, and 26 are flowcharts showing an operation of calling the CMS framework API two times. Since the operation is nearly the same as that described above, a detailed description thereof is omitted. FIG. 24 shows the operation of an application. FIG. 25 shows the operation of a CMS framework API. FIG. 26 shows the operation of a color management module. In this embodiment, as a means for the color management module to obtain a profile for observation environment correction through the user interface, a process therefor, shown in FIG. 26, is added.

Figure 27:
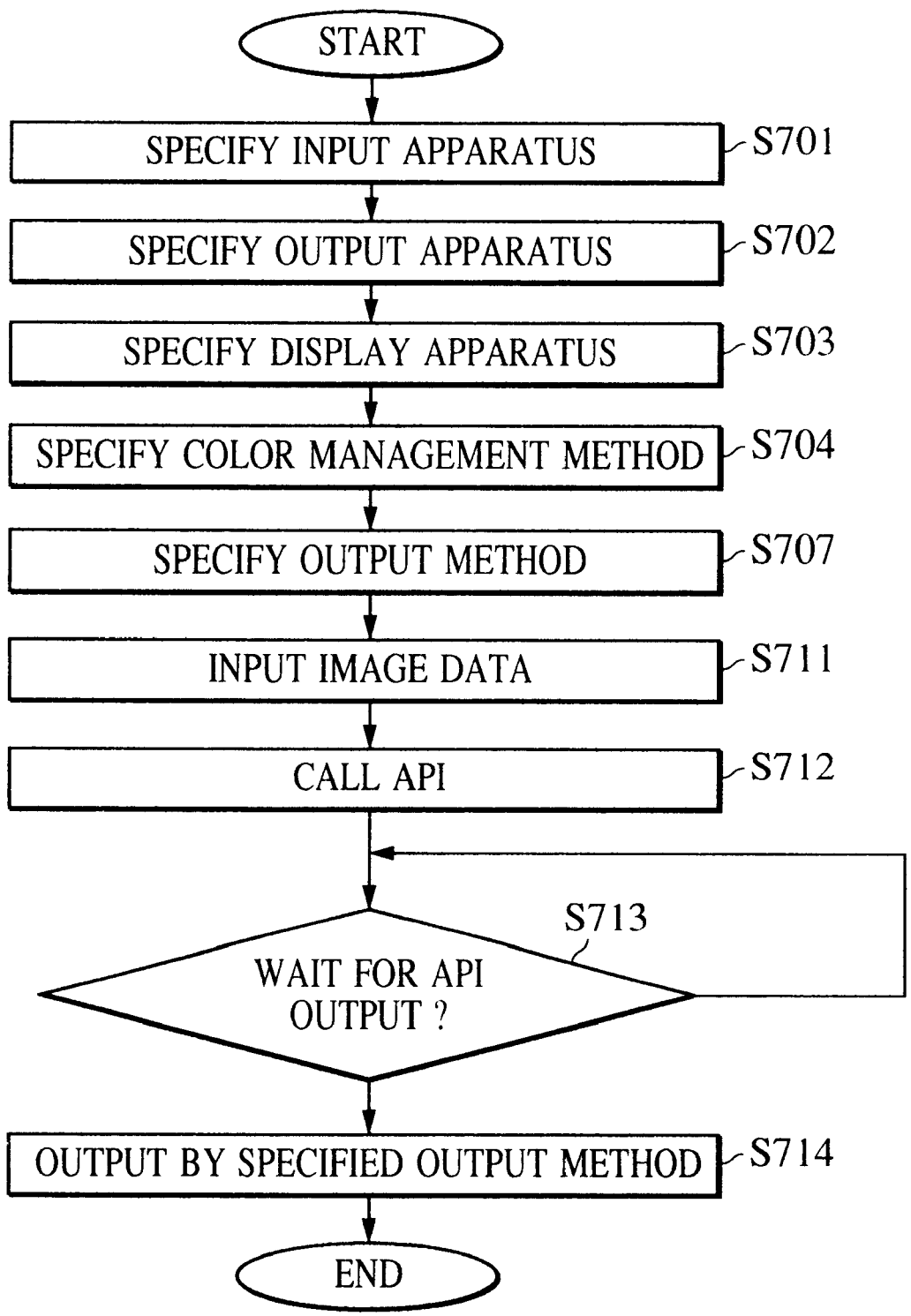
FIG. 27 is a flowchart of an application operation.
Figure 28:
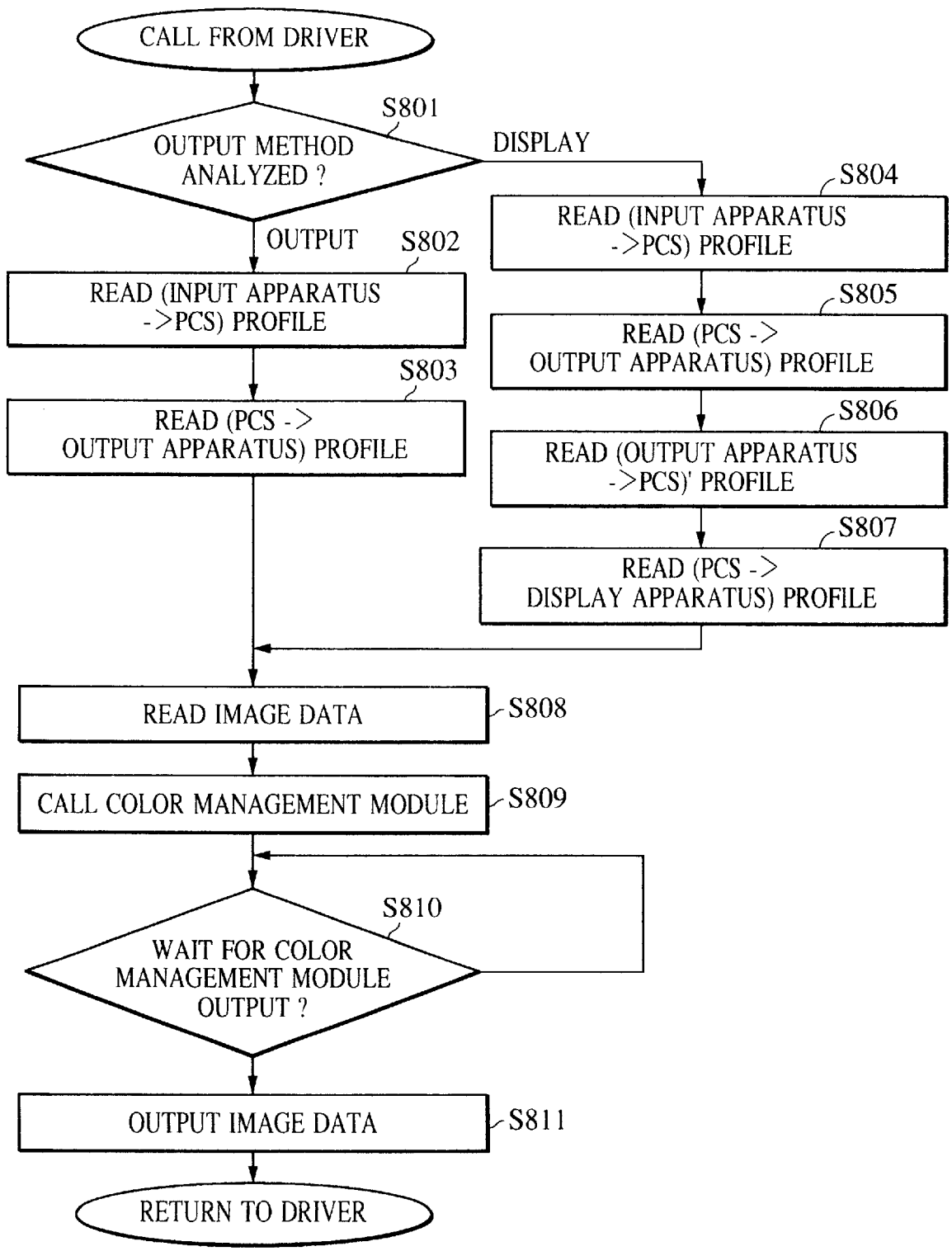
FIG. 28 is a flowchart of a CMS framework API operation.
Figure 29:
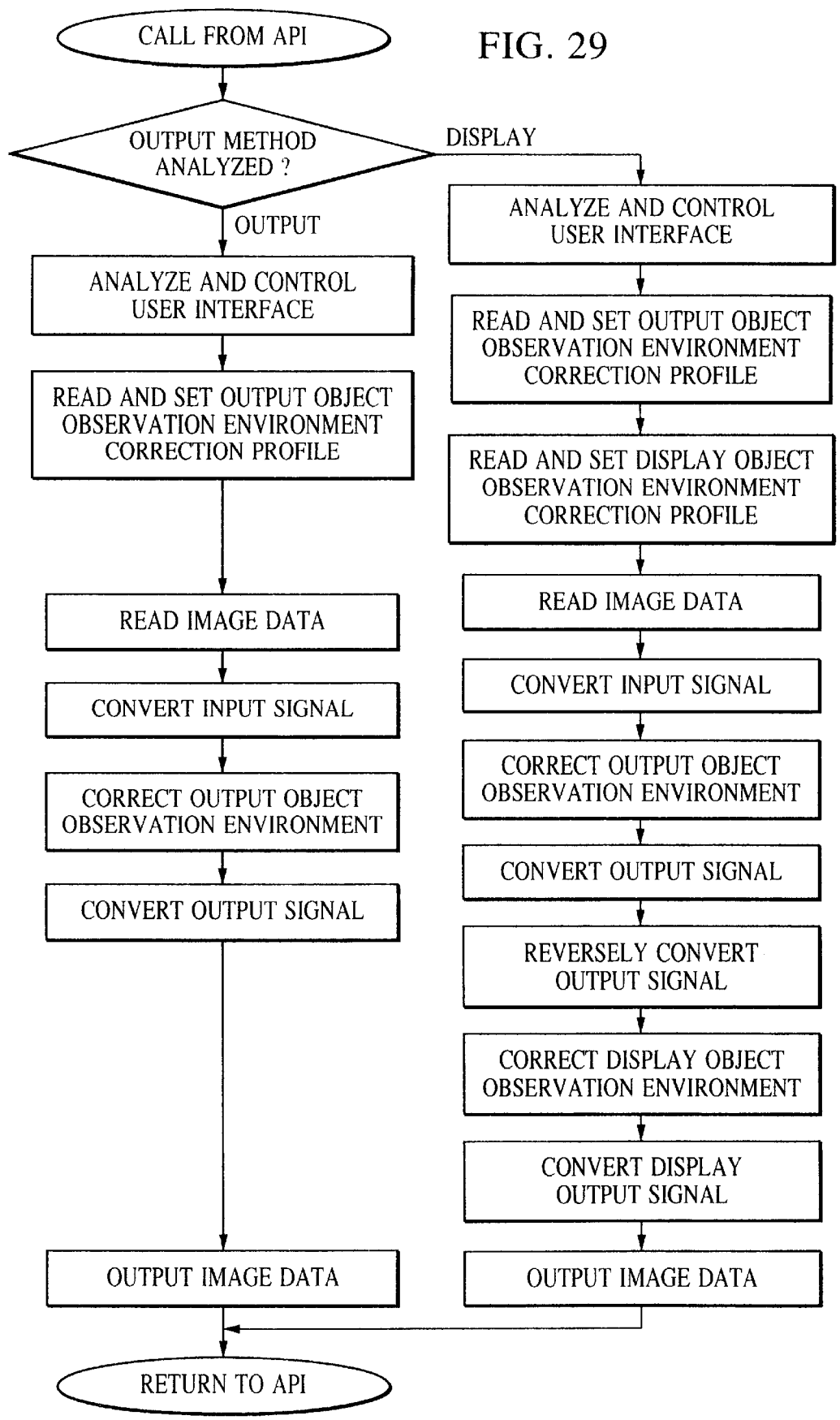
FIG. 29 is a flowchart of a color management module operation.

FIGS. 27, 28, and 29 show flowcharts of the operation in which the CMS framework API is used once. The operation is also the same as that described above. FIG. 27 shows the operation of an application. FIG. 28 shows the operation of a CMS framework API. FIG. 29 shows the operation of a color management module. Similarly to the above-described embodiment, a process in which the color management module obtains an observation environment correction profile through the user interface is newly added.

Fifth Embodiment

Figure 30:
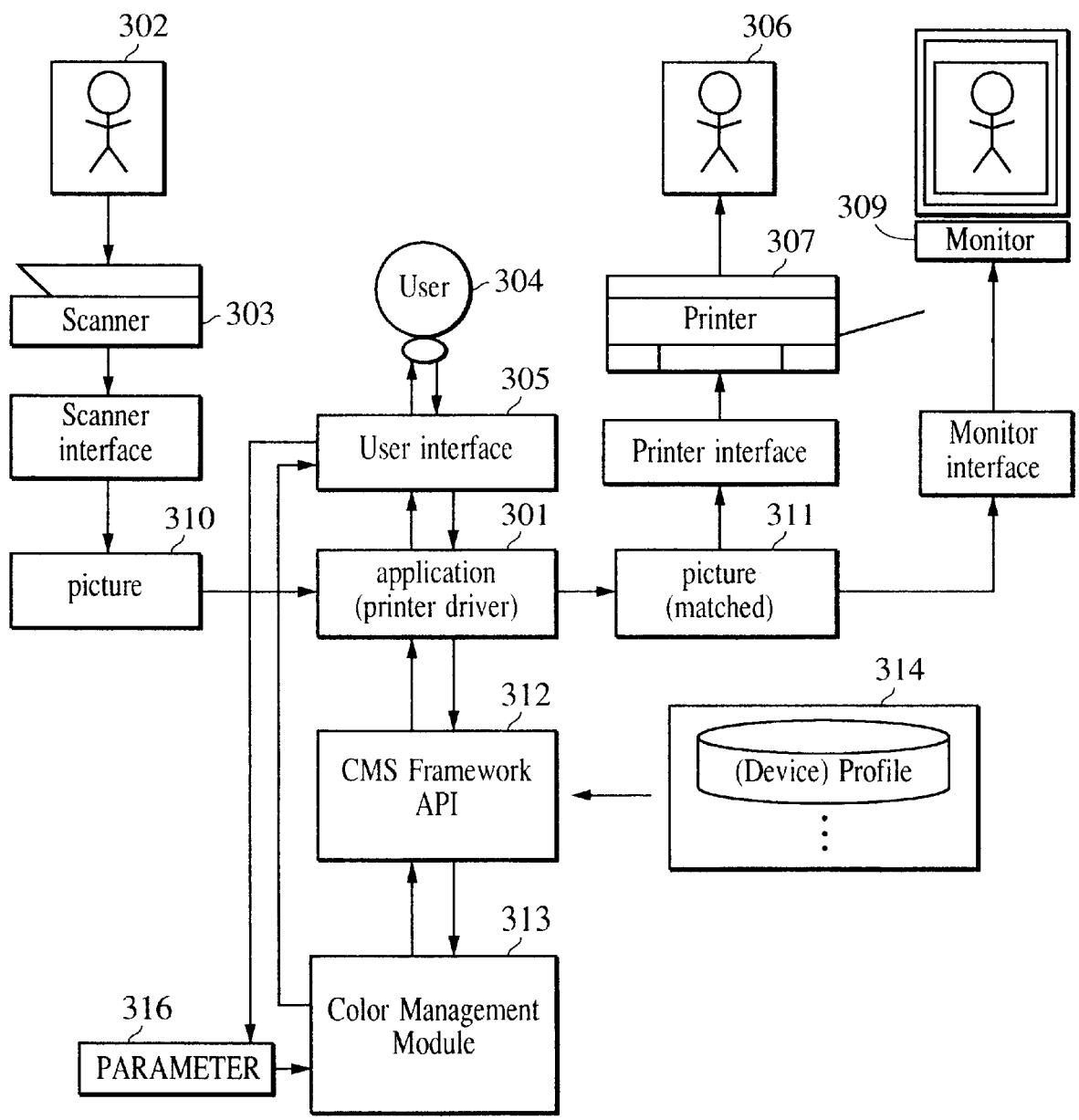
FIG. 30 shows a system of a construction in which a CMS framework API is used.

FIG. 30 is a system diagram showing the construction of a fifth embodiment in which the CMS framework API 312 is used, and a means which directly obtains an observation environment correction parameter is provided in the color management module 313.

The user interface 305, in this embodiment, communicates with the color management module 313.

The color management module 313 is called from the CMS framework API, performs image processing by using the received image data and profile in accordance with the command from the CMS framework API, and returns the result to the CMS framework API. At this time, the color management module 313 also performs observation environment correction, and selects an observation environment correction parameter required for that from an observation environment correction parameter group 316 through the user interface 305. Or, the color management module 313 directly obtains the observation environment correction parameter from the user interface 305.

The observation environment correction parameter is the output object observation environment correction matrix XYZ2X'Y'Z' and the display object observation environment correction matrix X1Y1Z12X1'Y1'Z1', described in the first embodiment. Or, the observation environment correction parameter is the color temperature and luminance of the observation light source, the color temperature and luminance of the white of the monitor, for determining the matrix by internal computation, the light-source correction matrix, and the adaptation proportion for obtaining the reference white during display object observation. By performing the computation described in the first embodiment using this information, the color management module 313 directly performs an observation environment correction process. Or, by performing the above-described computation once, the color management module 313 produces the output object observation environment correction matrix XYZ2X'Y'Z' and the display object observation environment correction matrix, and performs observation environment correction using these matrixes.

Next, the operation of this embodiment is described. The initial operation is the same as that of the fourth embodiment.

Figure 31B:
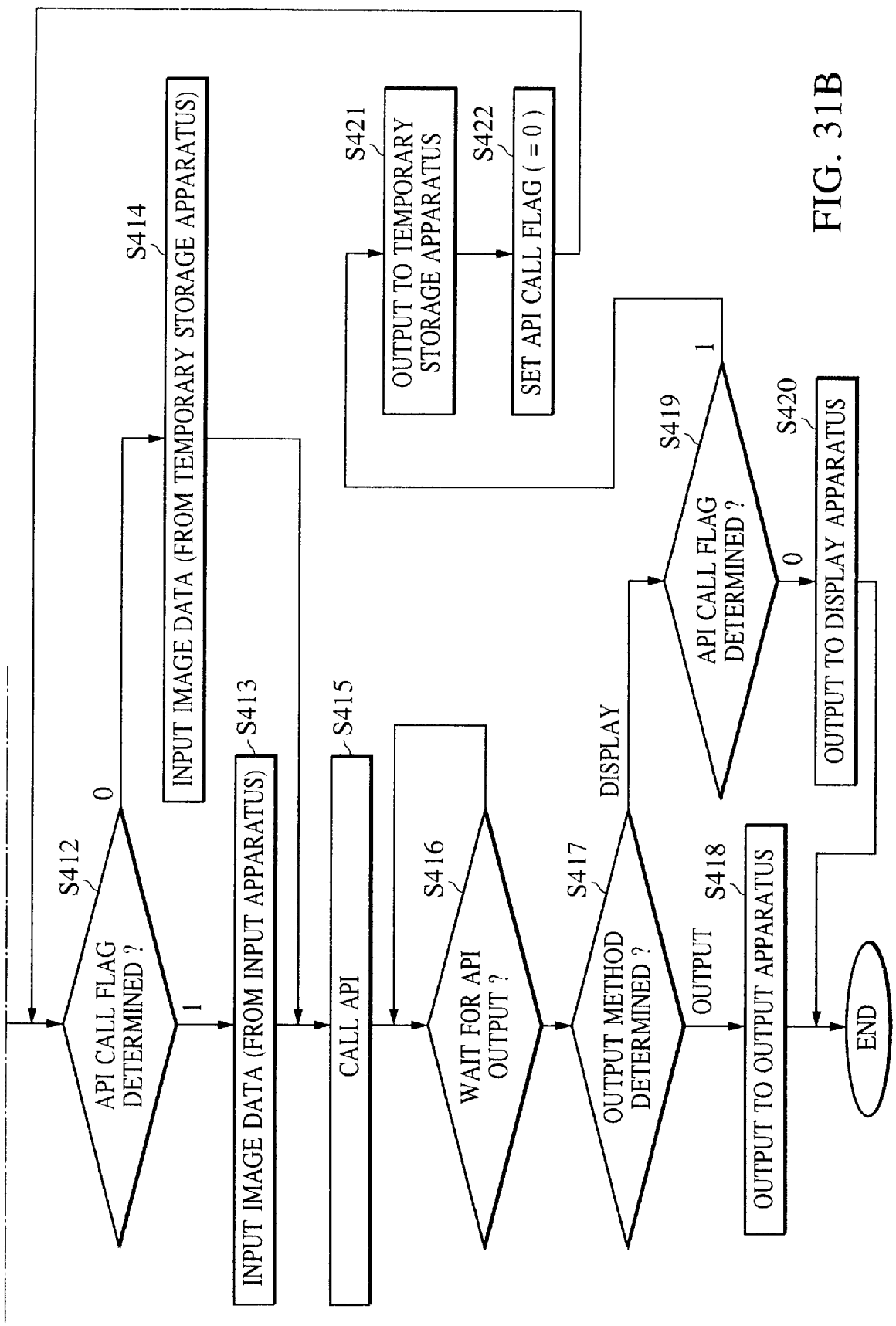
FIG. 31 is a flowchart of an application operation.
Figure 32:
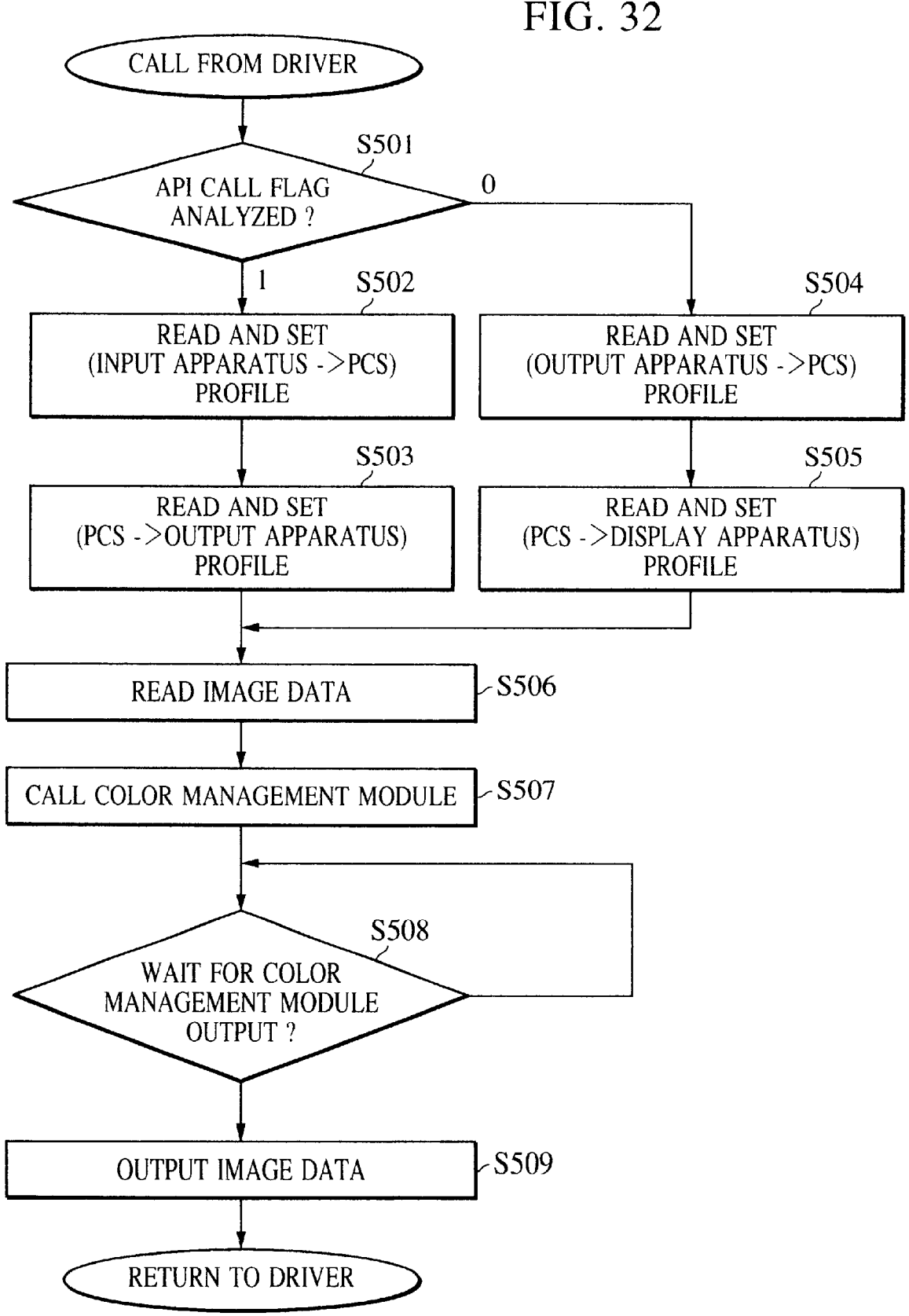
FIG. 32 is a flowchart of a CMS framework API operation.
Figure 33:
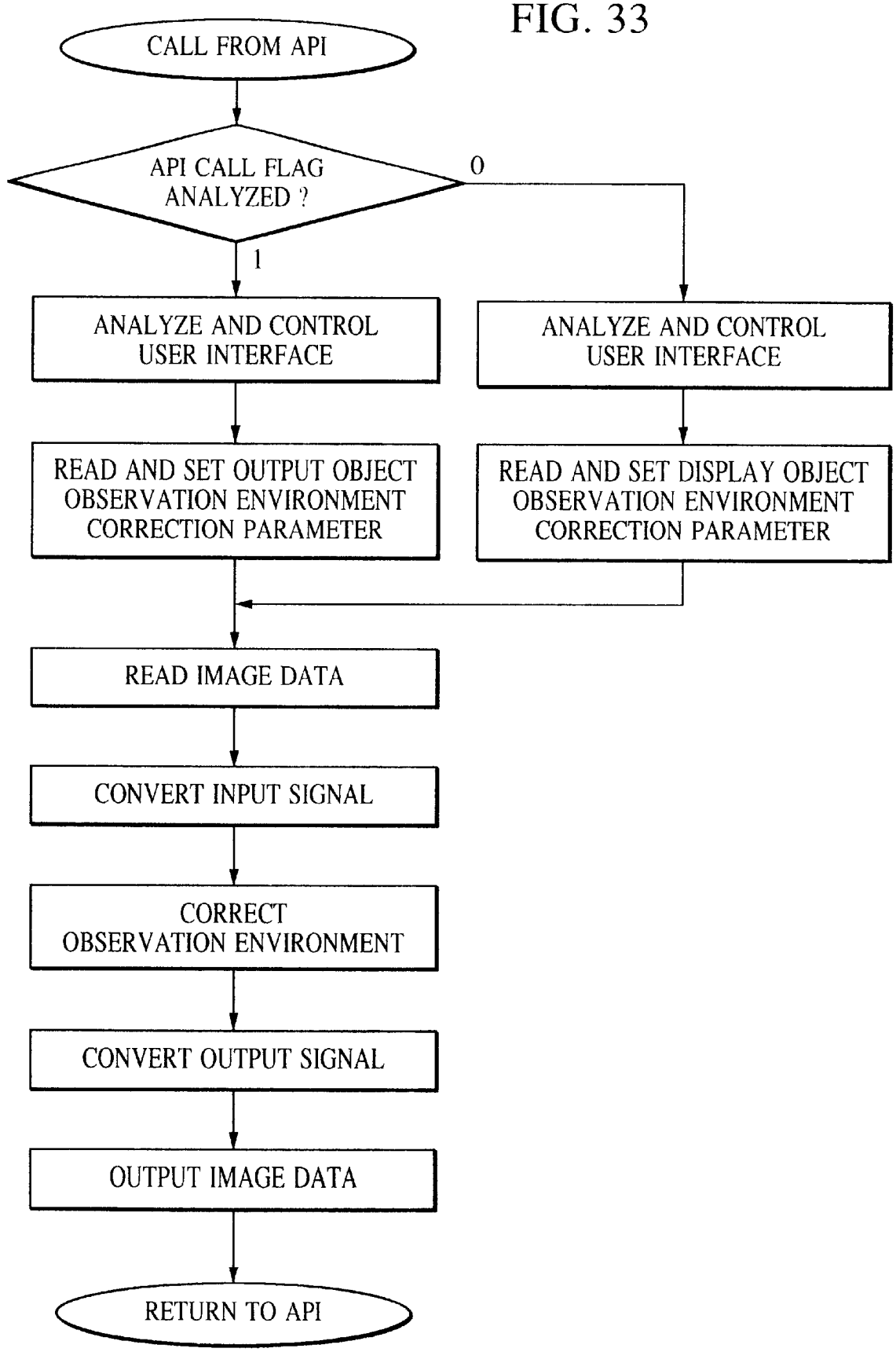
FIG. 33 is a flowchart of a color management module operation.

FIGS. 31, 32, and 33 show flowcharts of the operation of calling the CMS framework API two times. The operation is the same as that described above. FIG. 31 shows the operation of an application. FIG. 32 shows the operation of a CMS framework API. FIG. 33 shows the operation of a color management module. In this embodiment, a process in which the color management module obtains an observation environment correction parameter through the user interface is newly added.

Figure 34:
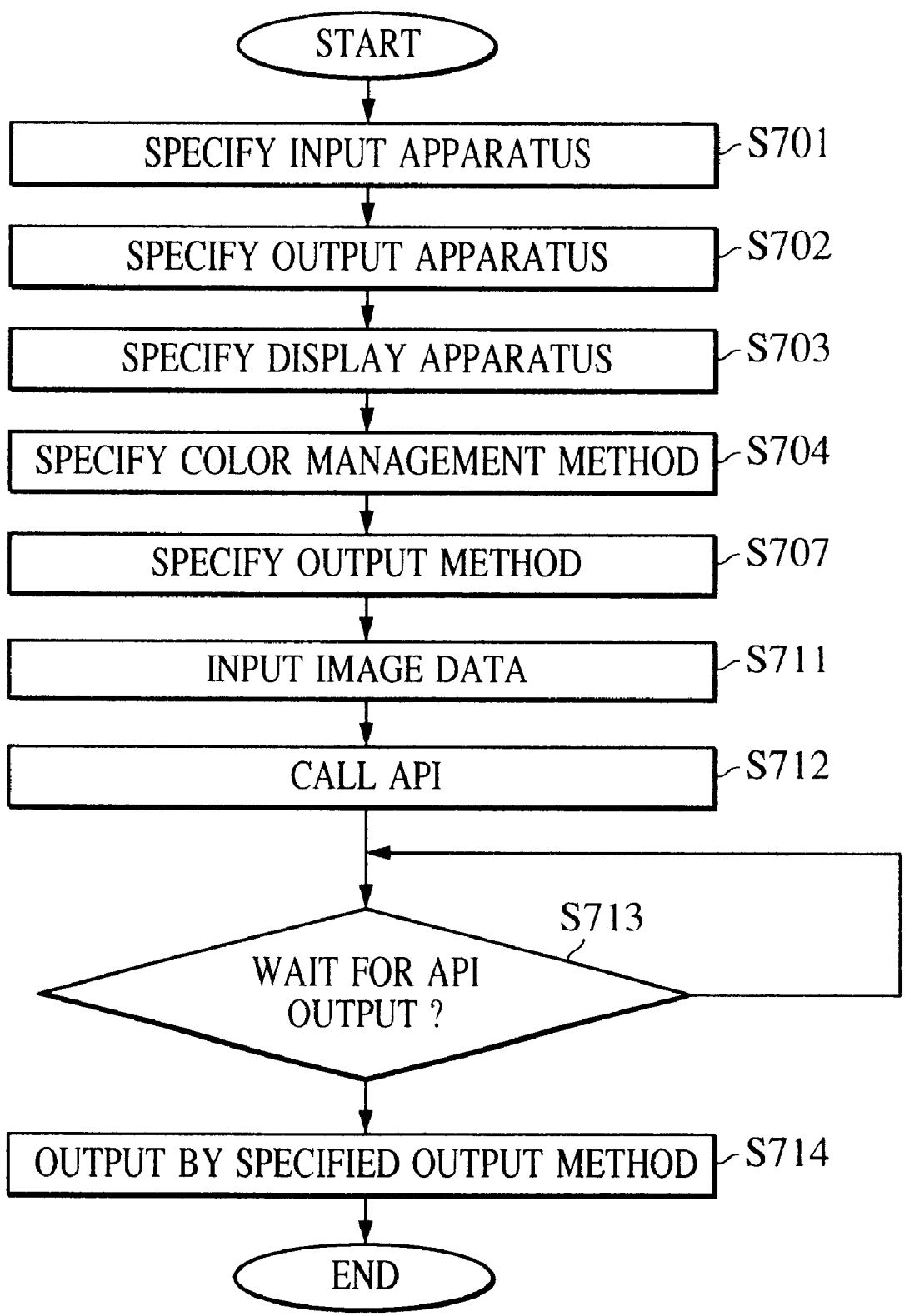
FIG. 34 is a flowchart of an application operation.
Figure 35:
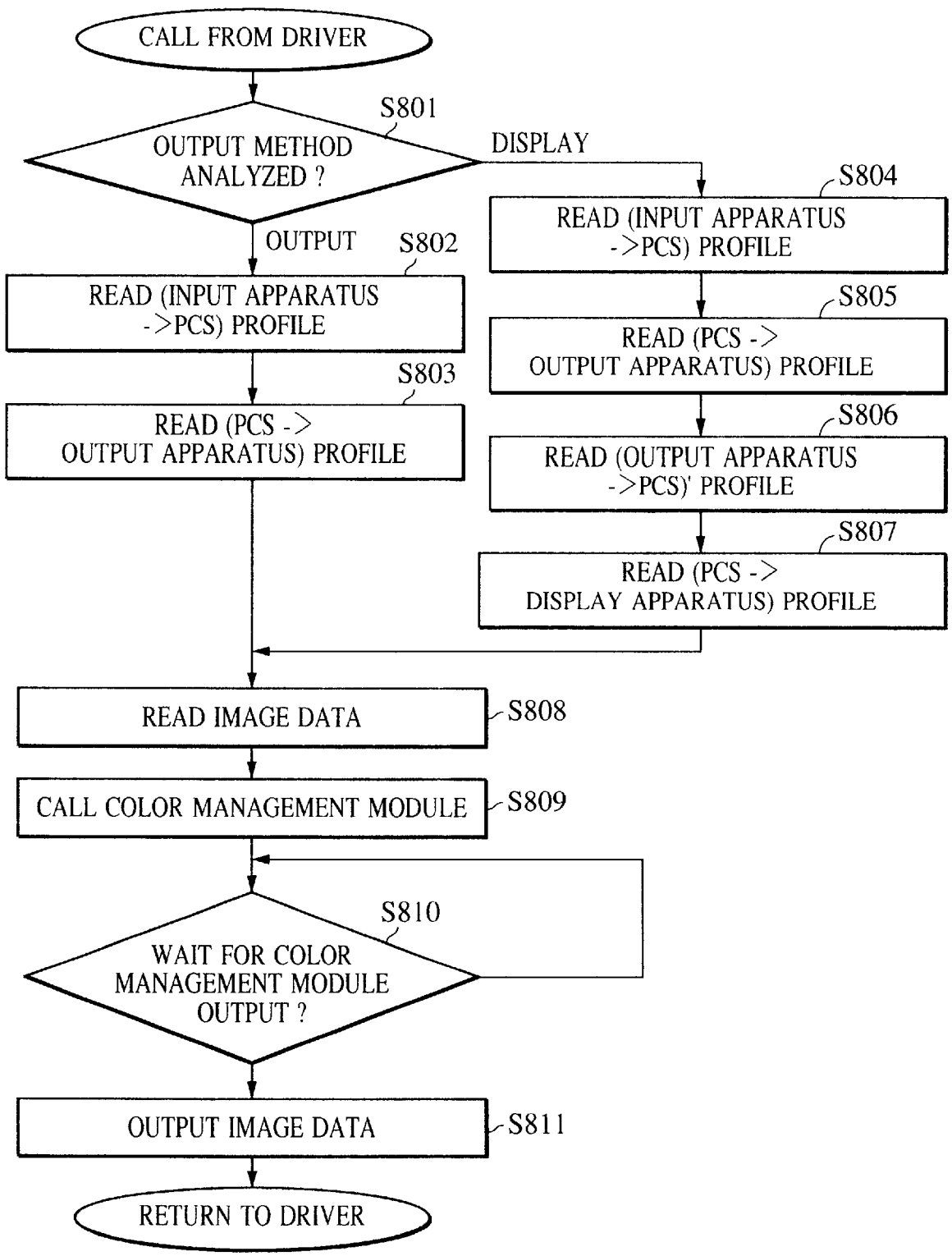
FIG. 35 is a flowchart of a CMS framework API operation.
Figure 36:
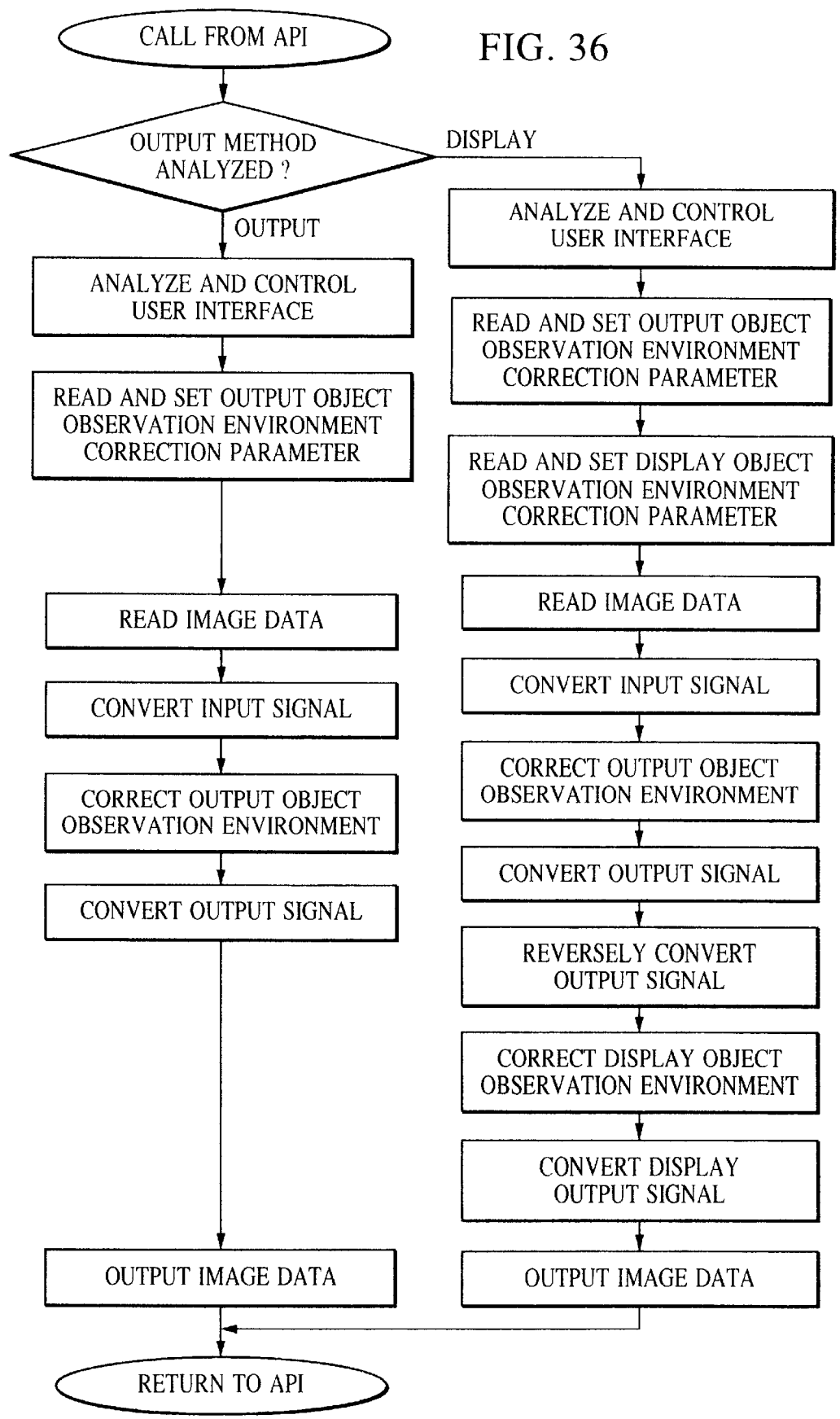
FIG. 36 is a flowchart of a color management module operation.

FIGS. 34, 35, and 36 show flowcharts of the operation of calling the CMS framework API once. The operation is the same as that described above. FIG. 34 shows the operation of an application. FIG. 35 shows the operation of a CMS framework API. FIG. 36 shows the operation of a color management module. Similarly to the above example, a process in which the color management module obtains an observation environment correction parameter through the user interface is added.

As can be seen in each embodiment thus far, in order to make the color appearance of the display object on a monitor and the printed matter the same, chromatic signals are converted by fully considering the characteristics of the ambient light (spectroscopic characteristics, color rendering, etc.).

Specifically, information (chromaticity value, XYZ tristimulus values, etc.) for white (white of paper under illumination light) sensed by the illumination light (environment light) is determined from the information (chromaticity value, color temperature, spectroscopic intensity (illuminance), etc.) for the illumination light (environment light), and information (for example, a two-dimensional matrix, etc.) for converting another color is obtained so that color-signal conversion is performed using this information.

According to each of the above-described embodiments, it is possible to convert a chromatic signal with high accuracy in accordance with various ambient-light sources, and possible to obtain the same appearance with sufficient accuracy with respect to a display object on a monitor and a printed matter.

Also, the present invention can be applied to various hardware structures and sequence processes appropriate to this. These sequence processes are, for example, formed into logic or software. Or, these sequence processes may be formed into an algorithm in a range without departing from the spirit and scope of the present invention, and can be applied as hardware or an apparatus in accordance with this algorithm.

The present invention is not limited to the foregoing embodiments, but many embodiments and variations are possible within the spirit and scope of the appended claims of the invention.

What is claimed is:

1. An image processing method of performing a correction process based on an observation environment by using a color management module, comprising:

an input step, of inputting device discrimination information and observation environment information;

a selection step, of, based on the device discrimination information, selecting a profile from a stored profile group, the profile having a public region and a private region, wherein, in the public region, conversion data indicating a relationship between a standard color space and a device color space is stored;

a rewrite step, of rewriting the selected profile by rewriting color correction data described in the public region of the selected profile, based on the observation environment information;

an addition step, of adding the rewritten profile to the profile group; and a performance step, of performing a color matching process on the image data by causing the color management module to use the profile data which corresponds to the device discrimination information.

2. An image processing method of performing a correction process based on an observation environment by using a color management module, comprising:

an input step, of inputting device discrimination information and observation environment information;

a selection step, of, based on the device discrimination information, selecting a profile from a stored profile group, the profile having a public region and a private region;

an addition step, of adding observation environment correction data, which corresponds to said observation environment information, to the private region of profile data which corresponds to the device discrimination information; and a performance step, of performing a color matching process on the image data by causing the color management module to use the selected profile data, wherein the color matching process uses a conversion data, which indicates a relationship between a standard color space and a device color space, in the public region of said selected profile, and said observation environment correction data in the private region of said selected profile.

3. An image processing method according to claim 1, wherein a device shown by the device discrimination information is an input device, and the color correction data is a matrix coefficient.

4. An image processing method according to claim 1, wherein a device shown by the device discrimination information is a display device, and the color correction data is a matrix coefficient.

5. An image processing method according to claim 1, wherein said observation environment information is provided by a user.

6. An image processing method according to claim 2, wherein correction data described in said profile data in advance is described in a public region.

7. An image processing method according to claim 2, wherein said observation environment information is provided by a user.

8. A computer program product embodying a program for implementing an image processing method of performing a correction process based on an observation environment by using a color management module, the program comprising:

program code for an input step of, inputting discrimination information and observation environment information;

program code for a selection step of, based on the device discrimination information, selecting a profile from a stored profile group, where the profile has a public region and a private region, wherein, in the public region of the profile data, conversion data indicating a relationship between a standard color space and a device color space is stored;

program code for a rewrite step, of rewriting color correction data described in a public region of the selected profile, based on the observation environment information;

program code for an addition step, of adding the rewritten profile to the profile group; and program code for a performance step, of performing a color matching process on the image data by causing the color management module to use the profile data which corresponds to the device discrimination information.

9. A computer program product embodying a program for implementing an image processing method of performing a correction process based on an observation environment by using a color management module, the program comprising:

program code for an input step, of inputting device discrimination information and observation environment information;

program code for a selection step of, based on the device discrimination information, selecting a profile from a stored profile group, the profile having a public region and a private region;

program code for an addition step, of adding observation environment correction data, which corresponds to said observation environment information, to the private region of profile data which corresponds to the device discrimination information; and program code for a performance step, of performing a color matching process on the image data by causing the color management module to use the selected profile data, wherein the color matching process uses a conversion data, which indicates a relationship between a standard color space and a device color space, in the public region of said selected profile, and said observation environment correction data in the private region of said selected profile.

10. An image processing method according to claim 1 further comprising the steps of:

combining said conversion data with said observation environment correction data; and rewriting the conversion data described in the public region of the selected profile into said combined conversion data.

* * * * *